(12) United States Patent
Roth

(10) Patent No.: US 12,458,032 B2
(45) Date of Patent: Nov. 4, 2025

(54) COMMINUTED MEAT PRODUCTS AND APPARATUSES AND METHODS FOR PRODUCING COMMINUTED MEAT PRODUCTS

(71) Applicant: Empirical Innovations, Inc., Dakota Dunes, SD (US)

(72) Inventor: Nicholas A. Roth, North Sioux City, SD (US)

(73) Assignee: empirical foods, inc., North Sioux City, SD (US)

( * ) Notice: Subject to any disclaimer, the term of this patent is extended or adjusted under 35 U.S.C. 154(b) by 30 days.

(21) Appl. No.: 17/963,407

(22) Filed: Oct. 11, 2022

(65) Prior Publication Data

US 2024/0057643 A1 Feb. 22, 2024

Related U.S. Application Data

(60) Provisional application No. 63/398,524, filed on Aug. 16, 2022.

(51) Int. Cl.
| | |
|---|---|
| A23L 13/60 | (2016.01) |
| A22C 17/00 | (2006.01) |
| A23D 9/05 | (2006.01) |
| A23L 5/20 | (2016.01) |

(52) U.S. Cl.
CPC .......... *A22C 17/0026* (2013.01); *A23D 9/05* (2013.01); *A23L 5/20* (2016.08); *A23L 13/60* (2016.08)

(58) Field of Classification Search
CPC . A23L 3/005; A23L 5/20; A23L 13/00; A23B 4/005–4/0053; A22C 17/0026; A22C 17/0093; A22C 17/002; A22C 17/008; A23D 9/02–9/05; A47J 43/16
See application file for complete search history.

(56) References Cited

U.S. PATENT DOCUMENTS

| | | | | |
|---|---|---|---|---|
| 1,943,019 | A | * 1/1934 | Henney | A23B 4/068 |
| | | | | 426/524 |
| 2,009,391 | A | * 7/1935 | Darling | A23J 1/02 |
| | | | | 426/480 |

(Continued)

FOREIGN PATENT DOCUMENTS

| | | |
|---|---|---|
| EP | 0024274 A1 | 3/1981 |
| EP | 1967082 A1 | 9/2008 |

(Continued)

OTHER PUBLICATIONS

Translation of JP 2003339308A (Year: 2003).*

(Continued)

*Primary Examiner* — Drew E Becker
(74) *Attorney, Agent, or Firm* — Fish & Richardson P.C.

(57) ABSTRACT

A method includes receiving a stream of input material made up of pieces of meat and separating a first material and a second material from the input material. The first material includes liquified meat fat and the second material includes raw lean meat. Fat granules are formed from a portion of the first material. A quantity of the meat fat granules at a meat fat blending temperature are then combined with a quantity of the second material at a lean meat blending temperature to produce a target comminuted meat product having a target lean point.

7 Claims, 10 Drawing Sheets

(56) References Cited

U.S. PATENT DOCUMENTS

| | | | | |
|---|---|---|---|---|
| 2,303,318 A | * | 12/1942 | Baskervill | C01B 25/20 423/317 |
| 2,527,493 A | * | 10/1950 | Condon | A23B 4/066 426/524 |
| 2,852,395 A | * | 9/1958 | Gaumer | A23B 4/068 426/524 |
| 2,917,388 A | * | 12/1959 | Sullivan | A22C 7/00 426/524 |
| 2,995,452 A | | 8/1961 | Odegaard | |
| 3,020,160 A | * | 2/1962 | Downing | A23J 1/002 426/480 |
| 3,050,399 A | * | 8/1962 | Kielsmeier | A23L 13/65 426/646 |
| 3,063,840 A | * | 11/1962 | Sullivan | A23J 1/002 426/480 |
| 3,078,165 A | * | 2/1963 | Alberts | A23J 1/002 426/480 |
| 3,098,747 A | | 7/1963 | Dubil | |
| 3,270,041 A | * | 8/1966 | Artar | C11B 1/12 554/8 |
| 3,780,191 A | * | 12/1973 | Langer | A23L 13/60 426/480 |
| 3,901,483 A | | 8/1975 | Lasar | |
| 4,098,913 A | * | 7/1978 | Baugher | A23D 9/007 426/573 |
| 4,171,164 A | * | 10/1979 | Groves | A22C 17/008 378/53 |
| 4,201,302 A | * | 5/1980 | Roth | B07C 5/342 99/489 |
| 4,361,590 A | * | 11/1982 | Wojcik | C11B 1/06 554/23 |
| 4,446,159 A | * | 5/1984 | Roth | A23L 13/67 426/802 |
| 4,567,050 A | * | 1/1986 | Roth | A22C 17/0093 426/480 |
| 5,006,361 A | * | 4/1991 | Cox | A23C 19/028 426/98 |
| 5,026,565 A | * | 6/1991 | McLachlan | A23L 17/70 426/480 |
| 5,167,977 A | * | 12/1992 | Gamay | A23L 17/70 426/480 |
| 5,211,980 A | * | 5/1993 | Cox | A23K 20/158 426/515 |
| 5,215,772 A | * | 6/1993 | Roth | A22C 17/002 426/480 |
| 5,382,444 A | * | 1/1995 | Roehrig | A23L 13/432 426/646 |
| 5,405,632 A | * | 4/1995 | Mahboob | A23L 13/30 426/243 |
| 5,472,725 A | | 12/1995 | Mendenhall | |
| 5,474,790 A | * | 12/1995 | Franklin | A23L 13/60 426/644 |
| 5,674,550 A | * | 10/1997 | Gundlach | A23L 13/70 426/480 |
| 5,762,993 A | * | 6/1998 | Gundlach | A23L 13/67 426/646 |
| 5,944,597 A | * | 8/1999 | Singh | A22C 17/00 426/480 |
| 6,379,728 B1 | | 4/2002 | Roth | |
| 6,780,191 B2 | * | 8/2004 | Sproul | A61B 17/8816 606/86 R |
| 6,949,265 B1 | * | 9/2005 | Schaefer | A23L 13/30 426/480 |
| 7,074,442 B2 | | 7/2006 | Crider | |
| 7,164,749 B2 | * | 1/2007 | Schrock | G01N 33/12 378/53 |
| 7,169,421 B2 | | 1/2007 | Tomey | |
| 7,415,428 B2 | | 8/2008 | Garwood | |
| 7,575,771 B2 | * | 8/2009 | Ciantar | A23K 50/42 426/480 |
| 7,666,456 B2 | | 2/2010 | Garwood | |
| 8,080,270 B1 | | 12/2011 | Schaefer | |
| 8,158,176 B2 | * | 4/2012 | Steiner | A23B 4/16 426/520 |
| 9,462,824 B2 | | 10/2016 | Garwood | |
| 9,872,505 B2 | | 1/2018 | Garwood | |
| 10,212,960 B2 | | 2/2019 | Garwood | |
| 10,238,124 B2 | | 3/2019 | Gardarsson | |
| 10,674,751 B1 | | 6/2020 | Roth | |
| 10,820,601 B2 | | 11/2020 | Garwood | |
| 10,980,259 B1 | | 4/2021 | Brown | |
| 11,147,297 B2 | | 10/2021 | Roth | |
| 2002/0048623 A1 | * | 4/2002 | Baarda | A22C 29/02 426/641 |
| 2003/0124221 A1 | * | 7/2003 | Garwood | B65D 21/062 426/35 |
| 2004/0121052 A1 | | 6/2004 | Roth | |
| 2005/0181111 A1 | * | 8/2005 | Domazakis | A23L 13/43 426/641 |
| 2007/0071878 A1 | | 3/2007 | Huebner | |
| 2008/0317917 A1 | * | 12/2008 | Janssen | A23D 7/0056 426/601 |
| 2009/0214730 A1 | | 8/2009 | Garwood | |
| 2009/0214733 A1 | | 8/2009 | Garwood | |
| 2010/0233344 A1 | * | 9/2010 | Galuska | A23D 9/05 426/601 |
| 2011/0062257 A1 | * | 3/2011 | Gould | A22C 17/008 209/552 |
| 2011/0076379 A1 | * | 3/2011 | Means | A23L 33/115 426/589 |
| 2011/0097457 A1 | | 4/2011 | Gardner | |
| 2011/0171353 A1 | | 7/2011 | Garwood | |
| 2012/0141645 A1 | * | 6/2012 | Tomcak | B03B 11/00 426/480 |
| 2012/0171331 A1 | | 7/2012 | Ervin | |
| 2012/0231131 A1 | | 9/2012 | Garwood | |
| 2013/0115349 A1 | * | 5/2013 | Garwood | A23L 13/60 426/417 |
| 2013/0142928 A1 | | 6/2013 | Garwood | |
| 2013/0177685 A1 | | 7/2013 | Garwood | |
| 2013/0323374 A1 | | 12/2013 | Garwood | |
| 2013/0323384 A1 | * | 12/2013 | Garwood | A23L 13/00 426/480 |
| 2014/0377426 A1 | * | 12/2014 | Garwood | A23L 13/60 426/417 |
| 2015/0010679 A1 | * | 1/2015 | Strong | A23L 3/06 99/468 |
| 2015/0289541 A1 | | 10/2015 | Brown | |
| 2015/0296813 A1 | * | 10/2015 | Gardarsson | A22C 5/00 700/265 |
| 2015/0305361 A1 | | 10/2015 | Holz-Schietinger | |
| 2015/0305388 A1 | | 10/2015 | Garwood | |
| 2015/0305390 A1 | | 10/2015 | Vrljic | |
| 2015/0366233 A1 | | 12/2015 | Brown | |
| 2016/0340411 A1 | | 11/2016 | Fraser | |
| 2017/0188612 A1 | | 7/2017 | Varadan | |
| 2017/0342131 A1 | | 11/2017 | Fraser | |
| 2017/0342132 A1 | | 11/2017 | Fraser | |
| 2018/0027851 A1 | | 2/2018 | Vrljic | |
| 2018/0235245 A1 | | 8/2018 | Garwood | |
| 2019/0008190 A1 | | 1/2019 | Garwood | |
| 2019/0008192 A1 | | 1/2019 | Brown | |
| 2019/0116855 A1 | | 4/2019 | Vrljic | |
| 2019/0124962 A1 | | 5/2019 | Meyer | |
| 2019/0133162 A1 | | 5/2019 | Varadan | |
| 2019/0133163 A1 | | 5/2019 | Varadan | |
| 2019/0166893 A1 | * | 6/2019 | Perdana | A23D 9/05 |
| 2019/0200658 A1 | | 7/2019 | Vrljic | |
| 2020/0029583 A1 | * | 1/2020 | Garwood | A22C 17/08 |
| 2020/0268004 A1 | | 8/2020 | Roth | |
| 2020/0397021 A1 | | 12/2020 | Henderson | |
| 2021/0030014 A1 | | 2/2021 | Brown | |
| 2021/0051977 A1 | | 2/2021 | Vrljic | |
| 2021/0070842 A1 | | 3/2021 | Fraser | |
| 2021/0251251 A1 | | 8/2021 | Holz-Schietinger | |
| 2021/0282435 A1 | | 9/2021 | Shalon | |
| 2021/0289824 A1 | | 9/2021 | Brown | |
| 2021/0307358 A1 | | 10/2021 | Henderson | |
| 2023/0217945 A1 | * | 7/2023 | Griiffin | A23L 13/00 426/656 |

(56) References Cited

U.S. PATENT DOCUMENTS

FOREIGN PATENT DOCUMENTS

| GB | 2240252 B | 11/1993 |
|----|-----------|---------|
| GB | 2332613 B | 5/2002 |
| WO | 2012170476 A2 | 12/2012 |

OTHER PUBLICATIONS

Translation of EP 2353400A1 (Year: 2011).*
Roth, Nicholas A., "Practical Elimination of Raw Meat Microbiological Risk Using Thermal Pasteurization, a Novel Meat-Safety-Driven Technology," vol. 5, Issue 3, 2021 Reciprocal Meat Conference Review Papers, Aug. 13, 2021.

* cited by examiner

COMMINUTED MEAT PRODUCTS AND APPARATUSES AND METHODS FOR PRODUCING COMMINUTED MEAT PRODUCTS

CROSS-REFERENCE TO RELATED APPLICATION

Applicant claims the benefit, under 35 U.S.C. § 119(e), of U.S. Provisional Patent Application No. 63/398,524 filed Aug. 16, 2022, and entitled "COMMINUTED MEAT PRODUCTS AND APPARATUSES AND METHODS FOR PRODUCING COMMINUTED MEAT PRODUCTS." The entire content of this provisional application is incorporated herein by this reference.

TECHNICAL FIELD OF THE INVENTION

This disclosure relates to raw comminuted meat products such as ground beef for example, and to methods and apparatuses for producing raw comminuted meat products, including raw comminuted meat products having a target lean to fat proportion.

BACKGROUND OF THE INVENTION

Comminuted meat products such as raw ground beef or ground pork for example have historically been produced by first deboning and trimming pieces of meat to produce pieces having approximately a desired lean-to-fat proportion by weight. These deboned and trimmed meat pieces were then diced and mixed in an effort to better distribute the meat fat throughout the mass of meat pieces. The mass of deboned, trimmed, diced, and mixed pieces of meat was then passed through a meat grinder one or more times to produce the ground meat product. A meat grinder used for this purpose includes a grinder plate and a blade that is driven to repeatedly sweep across openings in the grinder plate. In operation, a driving element such as an auger associated with the meat grinder forces the pieces of meat against the grinder plate openings so that portions of the meat enter the openings and then the blade passes across the openings to sever those portions of the meat that have entered the openings. As additional meat is forced against the grinder plate and into the plate openings, the previously severed material is displaced and ultimately forced out of the grinder plate openings as the ground meat product.

The lean-to-fat proportion of a comminuted meat product is commonly referred to as the lean point of the product. Governmental regulations may define a certain minimum lean point for a given product. For example, United States Department of Agriculture (USDA) regulations currently specify a minimum lean point of 70/30 (70% lean/30% fat by weight) for a comminuted beef product to be labeled as "ground beef." Current USDA regulations further require that ground beef must have a lean point of at least 90/10 to be labelled as "lean ground beef," and a lean point of at least 95/5 to be labelled as "extra lean ground beef." Products that have less than the labeled lean percentage by a defined margin of error are considered mislabeled and expose the producer to administrative penalties and potentially to liability from private civil action.

In addition to simply grinding meat pieces that have been trimmed to a desired lean-to-fat proportion, it is known from published European patent application EP1967082 and British patent GB2240252 to mix comminuted meat products at different lean points in a proportion to produce a desired target lean point. U.S. Pat. No. 7,169,421 shows mixing multiple streams of meat blends at potentially different lean points in the context of producing processed meat products such as bologna and hot dogs. In other examples, U.S. Pat. Nos. 7,666,456, 10,820,601, and U.S. Patent Application Publication No. 2014/0377426, all by inventor Anthony J. M. Garwood, each describe systems for producing a comminuted meat product from an input material made up of meat pieces (such as beef trim which will be described below).

A problem with prior processes for producing comminuted meat products is that they are overly sensitive to, or unpredictably influence by, variations in the lean and fat content of the pieces of meat making up the input materials. The input material, whether provided in one stream or in multiple streams to be blended together, must have a known lean-to-fat proportion for the final product to have the desired target lean point. However, it is challenging to accurately measure the lean and fat content of individual pieces of meat as a continuous process. Modern ground meat production operations may resort to expensive and cumbersome X-ray and sorting apparatuses for measuring the lean and fat content of meat pieces. Ground meat producers are sometimes forced to make allowances to account for wide variations in the input lean and fat content to ensure a given ground meat product has at least the minimum lean content defined for the product. These allowances result in the ground product often having a significantly higher lean content than indicated by the product label. Having a higher lean content in a ground meat product than required for a labelled lean point represents an inefficient use of the input material. Higher than intended lean meat in a ground meat product may also adversely affect the organoleptic properties of the ground meat product or of a product in which the ground meat product is included.

The difficulty of accurately measuring the lean and fat content of a collection of individual meat pieces arises in large part from the nature of raw meat. Raw meat from cattle, hogs, fish, and poultry is made up of muscle fibers bound together with connective tissue. These muscle fibers are linked to other groups of muscle fibers or linked directly to the animal's bone structure. The bundles of muscle fibers making up meat typically contain approximately 20% protein and 75% water with the remaining 5% made up of intramuscular meat fat, carbohydrate, and minerals (all percentages by weight). In addition to intramuscular meat fat, meat fat is included in meat as depot fat located either between bundles of muscle fibers or as a subcutaneous layer often found along an edge of a cut of meat. At the temperatures at which cuts of raw meat may be chilled for storage, typically below 40° F., both intramuscular fat and depot fat are present in the meat as solid layers or masses of white or off-white material. Both the irregularity in which fat is present in raw meat either as intramuscular fat or depot fat and the variability of the fat content from one piece of raw meat to the next contribute to the difficulty in accurately determining the overall lean and fat content of a collection of raw meat pieces.

Another issue in the meat processing industry that stems from the nature of meat is that of maximizing the amount of lean harvested as raw (uncooked/undenatured) lean meat from the animal carcass. An animal carcass is typically processed by first breaking the carcass down into primal cuts that are trimmed and divided further to produce individual cuts of meat such as filets, steaks, and roasts. The trimming needed to produce primal cuts and then individual cuts of meat produces a large quantity of edible trim material that includes lean meat and fat. This trim material is commonly sorted by processing facilities based on its approximate lean content. In the U.S. beef processing industry for example, the least lean of the edible trim is commonly referred to as extra-fat (XF) trim that is roughly 30% lean. Beyond XF trim, beef trimmings in U.S. beef processing operations are commonly sorted into 50% lean beef trim and into 65% lean beef trim. It is estimated that XF trim from modern trimming operations represents about 10.5 percent of the weight of the carcass, while 50% lean beef trimmings and 65% lean beef trimmings represent about 9% and 1 to 2% of the carcass weight, respectively.

The variability in lean and meat fat content in pieces of trim made it difficult to combine trim to produce a target lean point without using excessive allowances as described above to ensure the final product had the desired lean point. For example, in a stream of 50% lean beef trim pieces carried along a conveyor or through a conduit, a given cross section through the stream of material may pass through one or more pieces of trim and mostly meat fat with only very thin layers of lean meat. Even within this given cross section, the lean meat may be concentrated in a small area of the cross section and at any location within the cross section. Due to the essentially random manner in which the pieces of trim may be arranged in the stream of material and the uneven distribution of lean throughout a given piece of trim, another cross section through the material may pass through much more lean meat and much less meat fat with each type of material again distributed unevenly across the cross section. Thus a given quantity of meat pieces making up 50% lean beef trim may have an actual lean and fat content that varies significantly from 50% lean.

Another issue that arises with any ground meat product is the risk of contamination with pathogens such as certain strains of *E. coli* and *Salmonella*, for example. While whole muscle meat products such as steaks may, in the course of processing or handling prior to cooking, be contaminated with dangerous pathogens, the pathogens will typically reside only at the surface of the product and are killed or deactivated in the process of applying cooking heat to the meat outer surfaces. By contrast, any dangerous pathogens that may be on the surface of a piece of meat used to make a ground meat product could be distributed by the grinding process throughout the ground product. Thus it is recommended that ground meat products be thoroughly cooked to a pathogen killing or deactivating temperature prior to consumption.

SUMMARY OF THE INVENTION

The processes and systems described below can be implemented to precisely achieve a desired target lean point in a raw comminuted meat product even if the lean and fat content of the input materials is unknown or unpredictably varies. Also, embodiments described below can increase the likelihood of maximizing the amount of lean harvested as raw lean meat from the input materials (e.g., edible trim material that includes lean meat and fat) while advantageously reducing the likelihood of pathogen contamination within the comminuted meat product. Additional embodiments can further provide articles employed in processes of raw comminuted meat production and provide raw comminuted meat products produced according to these processes.

The following definitions will be applied to terminology employed in this disclosure and the accompanying claims. A "comminuted" meat product refers to a meat product that has been cut into pieces by grinding (as in a meat grinder), chopping (as in a bowl chopper), by cutting or chopping by hand with a suitable knife, or by any other process. Thus examples of comminuted meat products include raw ground beef, pork, lamb, chicken, and turkey. Additional examples of comminuted meat products include pieces of meat cut from a beef, pork, lamb, or poultry carcass. The designation "meat" refers to meat derived from any animal including mammals, fish and other seafoods, and birds, regardless of fat content. This includes ground meats such as ground beef and comminuted beef at a lower lean point than the lean point required for labeling as ground beef as described above, regardless of the size of constituent pieces and regardless of whether seasonings and other non-animal derived materials are present in the product. "Meat" also includes comminuted pork, lamb, poultry, and seafood in addition to combinations of species. "Lean meat" means meat constituents other than fat. "Lean meat" includes in particular the muscle fibers and connective tissues in meat together with water and minerals in the muscle fibers and connective tissue but excludes hard material such as bone and tendons. "Raw" as used with reference to lean meat means without significant protein denaturation so that the material essentially retains the physical characteristics of uncooked lean meat. "Meat fat" means any fat constituent of meat.

Methods according to a first aspect of this disclosure include receiving a stream of input material made up of pieces of meat and using raw lean meat and meat fat from the input material to produce a target comminuted meat product having a target lean point, that is, a target lean meat to meat fat proportion. The methods include separating a first material and a second material from the stream of input material. The first material is separate from the second material and includes liquified meat fat, while the second material includes raw lean meat. "Liquified meat fat" is used in this disclosure and the accompanying claims to describe meat fat in a state that conforms to a container in which the meat fat is contained. The liquified meat fat may be present in the first material with liquids (such as water for example) that were included in the pieces of meat making up the input material. Suspended materials and materials in solution or in emulsified form may also be present in the first material together with the liquified meat fat. Methods according to this first aspect further include forming meat fat granules from a portion of the first material. These methods further include combining a quantity of the meat fat granules at a meat fat blending temperature with a quantity of the second material at a lean meat blending temperature to produce a target comminuted meat product at a target lean point. The term "portion" is used here and elsewhere in this disclosure and the following claims to mean "at least some." That is, a portion of a given material may comprise all of the material or some fraction of the total amount.

The combination of separating out the liquified meat fat and raw lean meat from the input material and then using the two separated materials in the target comminuted meat product in accordance with the first aspect has the advantage of efficiently using the available lean meat from the input material. Thus the methods according to this aspect make very efficient use of the animal carcass. This overall efficiency can effectively reduce the number of slaughtered animals needed to produce a given amount of comminuted meat product from the animals and thus can reduce the resources required for producing a given amount of the comminuted meat product. Forming the first material containing the liquified meat fat into meat fat granules (discrete pieces of meat fat) allows the meat fat to be evenly distributed in the second material to produce the target comminuted meat product. Separating the meat fat and raw lean meat from the input material in accordance with the first aspect described herein also makes it unnecessary to employ complicated and expensive equipment to measure the lean and fat content of pieces of meat.

While the separation processes that can be used in various implementations described herein may be highly effective, they may not completely separate the meat fat from raw lean meat. The first material separated from the stream of input material may be substantially free of lean meat. By "substantially free of lean meat" it is meant (in this disclosure and the accompanying claims) that the content of lean meat in the first material is no more than approximately 1%. The lean meat content in the first material may be less than the content considered "substantially free of lean meat," for example, the first material may contain no more than approximately 0.5% lean meat, and in some cases no more than approximately 0.1% lean meat. The first material may alternatively be described herein as "consisting essentially of liquified meat fat" to describe a lean meat content in the first material. "Consisting essentially of liquified meat fat" refers to a material that has a sufficiently high liquified meat fat content and sufficiently low content of other meat constituents that the material retains at least the visual characteristics of meat fat.

Similarly, although the second material separated from the stream of input material in methods according to the first aspect includes raw lean meat, the second material will likely include some meat fat content in at least some implementations. In some implementations according to the first aspect, for example, the lean meat to meat fat proportion of the second material may be no less than approximately 94% so that the meat fat content of the second material may be as high as 6%. Regardless of the specific lean meat content in the first material and the specific meat fat content in the second material, the fat and lean content of each material is precisely controllable through the separation process or processes and may be held substantially constant over the time required to produce a given amount of target comminuted meat product. Thus the first and second materials may be combined in implementations described herein without having to account for the variability in lean and fat content of trimmed meat pieces making up the input material or smaller meat pieces formed from the input material pieces.

It should be noted here that numerical values set forth in this disclosure and the accompanying claims such as the content percentage values described above and the length values and temperature values described below are approximate values and are not strict boundaries. These approximate values are intended to encompass variations that are functionally similar. At a minimum, numerical values include variations that, using mathematical and industrial principles accepted in the art (e.g., rounding, measurement or other systematic errors, manufacturing tolerances, etc.), would not vary the least significant digit. All content percentage values set out in this disclosure and the following claims are by weight. For example, one hundred pounds of the first material containing a 1% lean meat content includes one pound of lean meat.

Forming meat fat granules from a portion of the first material may include cooling the first material to form solidified meat fat and then forming the meat fat granules from the solidified meat fat. The meat fat granules may be formed from the solidified meat fat by forcing portions of the solidified meat fat through grinder plate openings and periodically driving a blade over the grinder plate openings.

The meat fat granules may individually have a maximum dimension of no more than approximately 0.75 inches along any axis. Some implementations may include meat fat granules having smaller dimensions to help facilitate distribution of the meat fat throughout the target comminuted meat product. For example, in some implementations the meat fat granules may individually have a maximum dimension of no more than approximately 0.375 inches along any axis through the meat fat granule. As another example, and particularly in implementations in which the target comminuted meat product is packaged without a further comminuting step, the meat fat granules may individually have a maximum dimension of no more than approximately 0.50 inches along any axis or alternatively no more than approximately 0.25 inches or, as a further alternative, no more than approximately 0.125 inches. Still other implementations may include meat fat granules in two or more different and non-overlapping maximum dimension ranges.

Implementations in accordance with the first aspect may include many variations regarding the meat fat blending temperature and the lean meat blending temperature. Generally, both the meat fat blending temperature and the lean meat blending temperature should be low enough that meat fat from the meat fat granules does not smear in the process of combining the meat fat granules and second material. In some cases, the meat fat blending temperature may be no greater than 0° F. while the lean meat blending temperature may be no greater than approximately 26° F.

In some implementations of a method in accordance with the first aspect, the method may include separating a first component and a second component from the stream of input material. The first component here includes a fibrous raw lean meat constituent while the second component includes both a liquid raw lean meat constituent and the first material (including liquified meat fat). In reference to the liquid raw lean meat constituent separated from the input material as described herein, the term liquid means that the material is in a form that conforms to a container in which the material is placed. The liquid raw lean meat constituent may include water present in the meat pieces making up the input material, material in solution, emulsions, and suspended solids. Where the first and second components are separated, the method may further include separating the first material and the liquid raw lean meat constituent from the second component. In these methods, the second material used to mix with the meat fat granules to produce the target comminuted meat product is made up of the fibrous raw lean meat constituent and the liquified raw lean mean constituent that have been combined back together to form the second material. These two raw lean meat constituents may be combined to form the second material prior to combining with the meat fat granules.

Methods that separate out the fibrous raw lean meat constituent, the liquid raw lean meat constituent, and first material have the advantage of being able to better tailor an antimicrobial treatment to the given material. For example, because the first material separated from the stream of input material preferably does not contain any significant level of raw lean meat, the meat fat can be raised to a suitable antimicrobial temperature for an extended period of time without any concern for denaturing any significant quantity of proteins to be included in the target comminuted meat product. At least a portion of the raw lean meat comprising the second material may also be heat pasteurized without denaturing the protein as will be described further below.

Methods in accordance with the first aspect may include antibacterial treatments in addition to or alternatively to heat pasteurization. For example, some implementations may include raising the pH of the raw lean meat comprising the second material prior to combining with the meat fat granules.

A second aspect of this disclosure encompasses apparatuses for producing comminuted meat products. An apparatus according to this second aspect includes an input heat exchange system connected to receive a stream of input material that includes pieces of meat. The input heat exchange system is operable to heat the input material and produce a separation input material. This separation input material comprises a mixture of liquified meat fat and raw lean meat derived from the input material. A separator system is connected to receive a portion of the separation input material and to separate from that material a first material and a second material as described above in connection with the first aspect. A raw lean meat heat exchange system is connected to receive a portion of the second material from the separator system and is operable to cool the received second material, in some embodiments to the lean meat blending temperature. A meat fat granule production system is operable to receive the first material and produce meat fat granules. An apparatus according to this second aspect also includes a mixing system adapted to receive a quantity of the meat fat granules at the meat fat blending temperature and the second material at the lean meat blending temperature and mix the materials to produce a target comminuted meat product having a target lean point.

In some implementations according to this second aspect, the separator system includes two separators that operate in series to ultimately produce the first material and second material. In these implementations, a first separator in the system may be a decanter centrifuge and second separator in the system may be a centrifugal separator. The decanter centrifuge is connected to receive the separation input material and is operable for separating the first component (as described above) and the second component (as described above) from the received stream of separation input material. The centrifugal separator is connected to receive the second component from the decanter centrifuge and is operable for separating the first material and the liquid raw lean meat constituent from the received second component.

In some of these implementations, the apparatus further includes a heat pasteurization system connected to receive at least some of the liquid raw lean meat constituent. This heat pasteurization system may be specifically adapted for treating liquid raw lean meat and is operable to heat pasteurize the received liquid raw lean meat constituent while maintaining the material in the raw, undenatured state. A second heat pasteurization system may also be connected to receive a portion of the first material to heat pasteurize the meat fat to be included in the target comminuted meat product. A third heat pasteurization system specifically tailored to heat pasteurize the fibrous raw lean meat constituent may be connected to receive that constituent from the decanter centrifuge. Other implementations may include a heat pasteurization system adapted to heat pasteurize the fibrous raw lean meat constituent and liquid raw lean meat constituent after these constituents have been combined back together to produce the second material that is ultimately mixed with the meat fat granules to produce the target comminuted meat product.

Some implementations according to this second aspect employ a fat granule production device in the form of a grinder that forms the meat fat granules after the first material has been cooled to a solidified state. Additional details on suitable grinder devices will be described further below in connection with the representative embodiments.

A third aspect of this disclosure encompasses additional methods for producing a raw comminuted meat product. Methods according to this third aspect include receiving a stream of input material made up of pieces of meat and separating a first material and a second material from the stream of input material. The first material is separate from the second material and includes meat fat that is substantially free of lean meat, while the second material includes raw lean meat and has an essentially homogeneous lean meat and meat fat content. "Essentially homogeneous lean meat and meat fat content" as used here and in the accompanying claims means that any reasonable sample size of the material (for example, any given pound of the material) has a consistent lean meat and meat fat content (for example, varies by no more than approximately 1%) regardless of where the sample is taken in the material. For example, for a given 100-pound mass of second material in accordance with this third aspect, a 1 pound sample taken at a first point within the 100-pound mass may have a lean point of approximately 94/6 while a 1 pound sample taken at a second point within the 100-pound mass at any distance from the first point may have a lean point also of approximately 94/6. The lean meat to meat fat content variation from one point to another in the second material may alternatively have a lower value than approximately 1% such as 0.5% or 0.1% for example. Methods according to this third aspect further include forming meat fat granules from a portion of the first material including the substantially raw lean meat free meat fat. These methods further include combining a quantity of the meat fat granules at a meat fat blending temperature with a quantity of the second material at a lean meat blending temperature to produce a target comminuted meat product at a target lean meat to meat fat proportion, that is, a target lean point.

As with methods according to the first aspect described above, the first material may include a lean meat content at less than approximately 0.5%, or more preferably 0.1%. The lean meat to meat fat proportion in the second material separated according to this third aspect may be no less than approximately 94% in some embodiments or may consist essentially of raw lean meat.

Forming the meat fat granules in embodiments according to the third aspect may include forcing solid meat fat through a grinder as described above in connection with the first aspect. Regardless of how formed, the meat fat granules may have a dimension of no more than approximately 0.75 inches along any axis or more preferably no more than approximately 0.375 inches along any axis. Alternatively, the meat fat granules may have a dimension of no more than approximately 0.50 inches along any axis or alternatively no more than approximately 0.25 inches along any axis, or alternatively no more than approximately 0.125 inches along any axis. Methods according to the third aspect may include a meat fat blending temperature of no greater than approximately 0° F. and a lean meat blending temperature of no greater than approximately 26° F. Additionally, the separation steps and heat pasteurization steps described above in connection with the first and second aspects of this disclosure apply as well to methods according to this third aspect.

Additional aspects in this disclosure encompass comminuted meat products produced by the methods described above in connection with the first and third aspects and by apparatus described above in connection with the second aspect. In some embodiments, these comminuted meat products are distinguished from prior comminuted raw meat products in that at least some of the meat fat content of the product is in the form of meat fat granules formed from material separated from the stream of input material that also provides the lean meat content of the product. In further embodiments, a comminuted meat product produced by a method described above in connection with the first, second, or third aspects may be distinguished by the low lean meat content of the meat fat granules as described above and the low meat fat content beyond the meat fat content provided by the meat fat granules.

A further aspect of this disclosure encompasses articles produced in the course of performing the various methods described above. Such an article includes a quantity of meat fat granules as described above in connection with various embodiments. Such an article also includes a quantity of a lean material such that the quantity of lean material in proportion to the quantity of meat fat granules represents a target proportion of lean meat to meat fat. This lean material consists essentially of raw lean meat that has been separated from the stream of input material made up of pieces of meat. With reference to the lean material according to this further aspect of the disclosure, consisting essentially of raw lean meat means that the lean material includes a lean meat to meat fat proportion high enough so that the material can be mixed with the meat fat granules to produce the target proportion of lean meat to meat fat. In some embodiments, the lean meat to meat fat proportion of the lean material is no less than approximately 94%. In some embodiments, the meat fat granules in the product make up no less than one-half of the overall fat content of the product.

These and other advantages, features, and aspects will be apparent from the following description of representative embodiments, considered along with the accompanying drawings.

DESCRIPTION OF REPRESENTATIVE EMBODIMENTS

Figure 1:
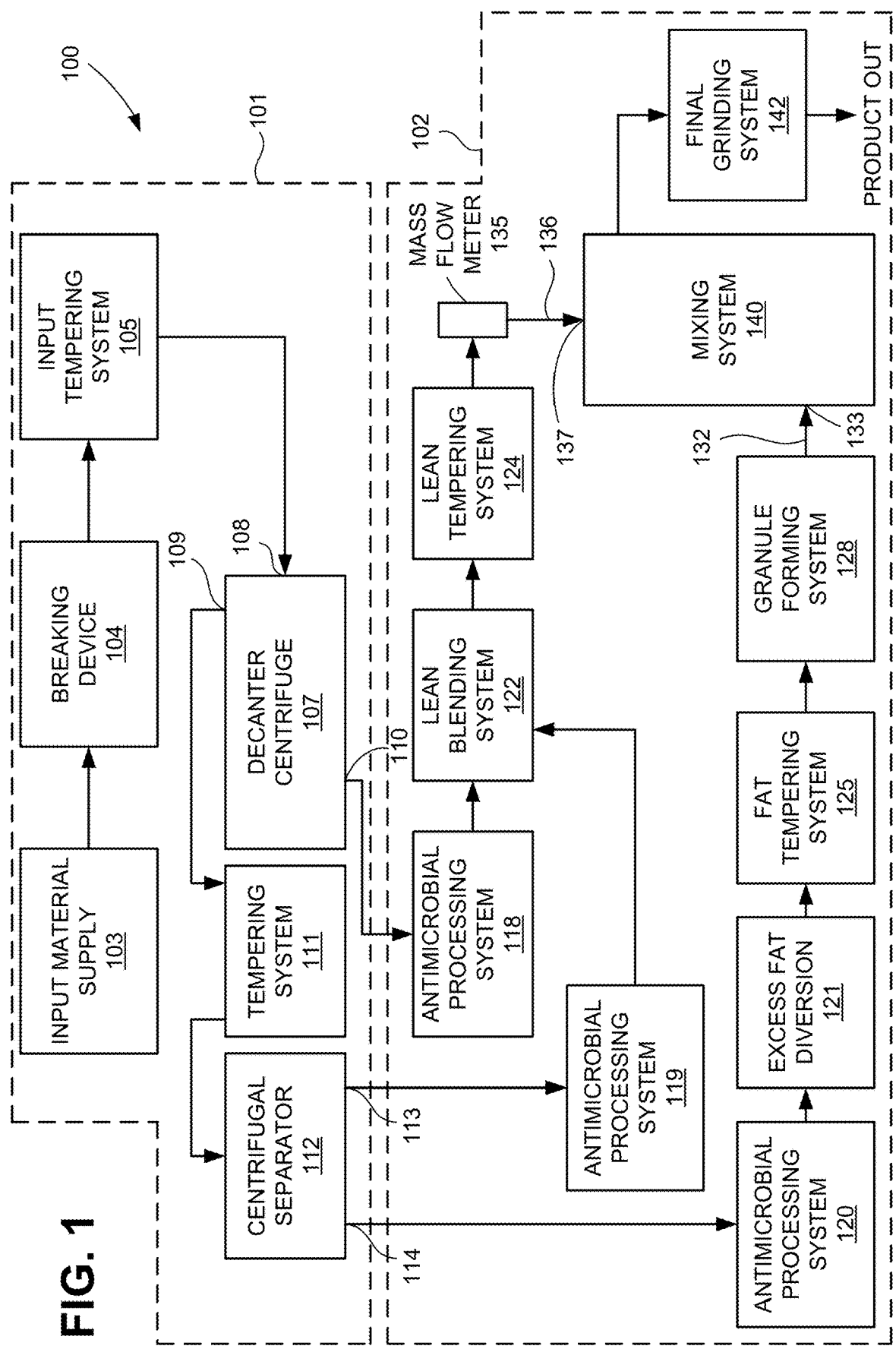
FIG. 1 is a schematic drawing of a comminuted meat production system in accordance with some embodiments.

Referring to FIG. 1, an example comminuted meat production system 100 includes generally an input and separation portion shown in dashed box 101 and a combining portion shown in dashed box 102. The input and separation portion 101 of apparatus 100 includes an input material supply 103, a breaking device 104, a tempering system 105, a tempering system 111, and two separate separators 107 and 112. The overall function of this input and separation portion 101 of system 100 is to condition an input material made up of meat pieces and to separate out a stream of meat fat and a stream of raw lean meat that may each have a substantially constant meat fat and lean meat content.

In the example system 100 shown in FIG. 1, input material supply 103 may comprise a suitable conveyor system conveying pieces of meat trim to breaking device 104. The pieces of meat trim may vary widely in terms of lean-to-fat proportion. For example, when the system 100 is applied to produce a comminuted beef product, a conveyor of the input material supply 103 may convey at any given point in time, XF trim, 50% lean beef trim, or 65% lean beef trim. Raw lean meat from any of these types of trim may be incorporated into the same final comminuted meat product.

Breaking device 104 may comprise a coarse grinder device that is adapted to receive input material and to perform an initial commutation to reduce the input material to smaller pieces suitable for further treatment in the system. Such a grinder may drive the pieces of meat trim to a grinder plate having uniformly sized plate openings from 0.25 inch to 1.5 inches in diameter, for example. Tempering system 105 comprises a suitable device or arrangement of devices for increasing the temperature of the comminuted input material received from breaking device 104 to a separation temperature. For example, tempering system 105 may include a tube in shell heat exchanger operably connected to receive the comminuted input material from breaking device 104 and gently increase the temperature of the material while maintaining the lean meat constituents in a raw state. A suitable separation temperature for input material comprising beef trim may range from 90° F. to 105° F. for example. At this separation temperature, substantially all of the meat fat in the heated material is in a liquified state while the entire spectrum of proteins in the lean meat from the comminuted beef trim remains undenatured.

The mixture of liquified fat and raw lean meat (which may be referred to as a separation input material) from tempering system 105 is directed in system 100 to an input port 108 of separator 107. Separator 107 in this example system is a solid/liquid separator operable to separate the mixture received at input port 108 into a first component that exits separator 107 at a first component output port 110 and a second component that exits separator 107 at a second component output port 109. The first component includes a fibrous raw lean meat constituent of the raw lean meat in the input material and represents one of multiple inputs to the combining portion 102 of system 100 in FIG. 1. The second component from port 109 includes a mixture of both a liquid raw lean meat constituent of the raw lean meat in the input material and liquified meat fat from the input material, and is directed first to tempering system 111 and then to an input port of centrifugal separator 112. Tempering system 111 functions to temper the material from port 109 of separator 107 as necessary to a suitable temperature for separation in separator 112, still a temperature at which the lean meat content in the material remains in a raw state.

Separator 112 operates to separate the second component material into a stream of the liquid raw lean meat constituent and a stream of liquified meat fat. The stream of liquid raw lean meat constituent exits separator 112 through output port 113 while the stream of meat fat exits separator 112 through output port 114. In this example system 100, both of these streams of material, the stream of liquid raw lean meat constituent from output port 113 and the stream of liquified meat fat from output port 114, represent additional inputs to the combining portion 102 of system 100 shown in FIG. 1.

The input and separation portion 101 of apparatus 100 can be implemented to advantageously use the high fat content trim left over from trimming operations (which is often available at a lower price than higher lean trim in terms of lean content). For example, the input and separation portion 101 of apparatus 100 can use XF trim at 30% lean content as an input stream, but as detailed below, the apparatus can output a comminuted meat product at a target lean point that is precise and far higher than 30%. In such embodiments, the ability of the apparatus 100 to use a variety of high fat content trim from trimming operations enables the producer here to employ some of the most cost-effective input materials.

The combining portion 102 of example system 100 includes a respective antimicrobial processing system for each of the streams of material comprising an input to the combining portion. Antimicrobial processing system 118 receives the stream of first component (the fibrous raw lean meat constituent) from separator 107, antimicrobial processing system 119 receives the stream of liquid raw lean meat constituent from separator 112, and antimicrobial processing system 120 receives the stream of liquified meat fat from separator 112. Each of these antimicrobial processing systems 118, 119, and 120, may be specifically adapted for the particular input material as will be described further below.

In this example system 100 shown in FIG. 1, the liquid raw lean meat constituent after processing in antimicrobial system 119 is combined with the fibrous raw lean meat constituent exiting antimicrobial processing system 118 in a lean meat blending system 122. Lean meat blending system 122 comprises a suitable blender device such as a twin paddle blender and is operable to recombine the fibrous raw lean meat and liquid raw lean meat to form a mixture comprising a stream of raw lean meat directed to tempering system 124. This tempering system 124 is adapted to reduce the temperature of the raw lean meat to a suitable blending temperature for the material, that is, a lean meat blending temperature. The raw lean meat at the lean meat blending temperature exits tempering system 124 and is then directed to mixing system 140 through a conduit shown at 136 in FIG. 1 and enters the mixing system through a raw lean meat input port 137. A mass flow meter 135 is included in the path from tempering system 124 to mixing system 140 in this example system. Mass flow meter 135 may comprise a Coriolis effect type meter or any other suitable meter for measure the mass flow to mixing system 140.

At least a portion of the liquified meat fat exiting antimicrobial processing system 120 is directed to a tempering system 125 for the meat fat. Because the amount of meat fat needed for combining with the lean meat is commonly much less than the amount of meat fat produced from the separation system comprising separators 107 and 112, some of the liquified meat fat may be diverted from tempering system 125 through a diversion system shown at 121 in FIG. 1. This diversion of excess liquified meat fat will be described further below in connection with FIGS. 2 and 3. Tempering system 125 reduces the temperature of the meat fat received from antimicrobial processing system 120 to form solidified meat fat. The solidified meat fat is then directed to granule forming system 128 which produces granules of solid meat fat of a desired size or within a desired size range for introduction at the meat fat blending temperature into mixing system 140. These meat fat granules are directed to mixing system 140 through a conduit 132 to a meat fat granule input port 133.

Mixing system 140 comprises a suitable mixing or blending device that includes a mixing vessel defining a mixing volume for receiving the raw lean meat from lean tempering system 124 and meat fat granules from granule forming system 128 in proportions necessary to result in the target lean point for the final comminuted meat product. This mixing vessel may include a conduit where mixing system 140 comprises an inline mixing system. The proportion control (weight proportion of raw lean meat to meat fat) needed to result in the target lean point may be provided through mass flow meters such as meter 135 shown in FIG. 1 and mass flow meter 203 described below in connection with FIG. 2. In the mass flow meter arrangement, the mass flow meters measure the mass of material entering the mixing vessel of mixing system 140 to ensure the desired weight proportion between the raw lean meat and meat fat. Alternative proportion control arrangements will be described further below in connection with FIGS. 4 and 5. The example system 100 shown in FIG. 1 includes a final grinding system 142 operatively connected to receive the mixed raw lean meat and meat fat granules from mixing system 140 and perform a final grind. The material at the output of final grinding system 142 comprises a comminuted meat product (PRODUCT OUT in FIG. 1) at the product target lean meat to meat fat proportion (target lean point) and that is visually and functionally similar to ground meat product produced according to traditional methods. As described in more detail below, some embodiments of the comminuted meat product can be processed in a manner that effectively eliminates pathogen contamination and achieves a raw meat product that remains shelf-stable for a period of time (multiple days for example) even when unrefrigerated.

It will be appreciated that the system 100 shown schematically in FIG. 1 will include numerous devices such as valves and manifolds for controlling and regulating the flow of the various streams of material through the system. Downstream from breaking device 104, materials may be transported from one device or system to the next through suitable conduits. Suitable pumping devices may be included in the various processing devices or outside of those devices for moving the various streams of material through the system. Additional flow paths and control elements and devices may be required for periodic clean in place operations at various parts of system 100. All these flow control and facilitating devices and their respective connectors and fittings are omitted from the figure to avoid obscuring features of the illustrated embodiments in unnecessary detail.

It should also be appreciated that the arrangement of devices and systems shown in FIG. 1 may be varied significantly while remaining within the scope the various aspects of this disclosure and the various implementations described herein. For example, although system 100 is shown as including breaking device 104, some implementations of the system may receive an input material that is already sufficiently comminuted for tempering and separating into the stream of meat fat and stream of raw lean meat. Such systems may dispense with breaking device 104. Where a breaking device such as device 104 is included in the system, any suitable comminuting device may be employed. A meat grinder as described above is desirable for use as breaking device 104 because it is amenable to continuous operation to provide a continuous stream of comminuted input material for further processing. Other implementations may include a comminuting device such as bowl chopper to provide the breaking function in a batch operation mode as opposed to continuous operation. Still other implementations may include a device for removing bone from the input material. Including bone removal in the process may allow the input material to include bone-in material. In these implementations the bone removal function can be incorporated in breaking device 104 or performed by a separate deboning device.

Another variation on the system shown in FIG. 1 relates to the output from mixing system 140. Although grinder system 142 is shown in FIG. 1, other embodiments of the system may not grind the output of mixing system 140. In these alternate systems, the output of mixing system may be directed to a chub packaging system or other type of packaging system for packaging the target comminuted meat product.

Some implementations of system 100 may also include additional processing components. For example, the stream of comminuted input material may include sinew that is advantageously removed prior to processing through the separator(s). Such a desinewing device may be included in the system at an appropriate location such as just upstream of tempering system 105. Where the input material supply includes bones, some embodiments of system 100 may additionally include a device or system suitable for separating bone from the input material. Alternatively, one of the devices shown in system 100 may be adapted also for separating out bone and other hard material.

Also, although the illustrated system 100 in FIG. 1 includes two separate separators to produce the stream of meat fat and the material forming the stream of raw lean meat, any separation system or technology now known or developed in the future may be used to produce these two streams of material from which the final comminuted meat product is produced. In some embodiments, a single separation device could be used to produce the first material and second material described herein.

Where multiple separators are employed such as shown in FIG. 1, separator 107 may comprise a decanter centrifuge and separator 112 may comprise a centrifugal separator. A decanter centrifuge includes a housing that is rotated about a typically horizontal axis at high speed with a scroll mounted within the housing and rotating at a speed slightly different from the housing rotational speed. An input mixture of liquids and solids introduced into the housing though a passage in the center of the scroll is accelerated by the rotating housing causing heavier material from the mixture to collect at the inside surface of the housing with lighter material remaining inward of the housing inside surface. Auger flights on the scroll move solids in the collected heavier material to a solids outlet, while the liquids from the input mixture migrate to a liquid outlet. In the example system shown in FIG. 1, output port 109 may comprise the liquid outlet of a decanter centrifuge while output port 110 may comprise the solids outlet of the decanter centrifuge.

A centrifugal separator comprises a housing commonly referred to as a "bowl" or "drum" that is rotated about a typically vertical axis at high speed. A mixture of relatively heavy and light liquid constituents introduced into the bowl is accelerated by the rotation of the bowl causing the heavier liquid constituents to collect at the maximum diameter of the bowl and the lightest constituents to migrate toward the center of the bowl. In some cases the migration of lightest constituents toward the center of the bowl may be aided by angled disks mounted in the bowl and rotating with the bowl. The heavier liquid constituents collected at the outer portion of the bowl (relative to the axis of rotation) may be removed by periodically opening the bowl or continuously through suitable pathways while the light constituents may be removed from an area in the bowl nearest the axis of rotation by suitable means such as a centripetal pump integrated with the separator. In the example system 100, output port 113 of separator 112 may comprise the heavier liquid (liquid raw lean meat) outlet(s) from pathways of a centrifugal separator and output port 114 may comprise the lighter liquid material (liquified meat fat) output of the centrifugal separator.

Although system 100 shown in FIG. 1 includes antimicrobial systems 118, 119, and 120, other implementations may include no such antimicrobial systems. However, antimicrobial processes are desirable in a comminuted meat production system given the possibility of pathogenic microbes inadvertently distributed in the comminuted material during processing. An advantage of system 100 is that by separating the comminuted input material to produce separate streams of liquified meat fat, fibrous raw lean meat constituent, and liquid raw lean meat constituent, antimicrobial systems may be selected and operated according to operating parameters that are most suitable for the given stream of material, both in terms of efficacy and cost-effectiveness. For example, the antimicrobial processing system 120 for the liquified meat fat may comprise a heat exchange system operable to heat the meat fat to a suitable temperature for killing or deactivating pathogenic microbes, and this heat exchange system may operate in parallel (and perhaps contemporaneously with) the antimicrobial processing system 119 that employs a heat pasteurization process that pasteurizes the liquid raw lean meat without denaturing the material. Where the stream of liquified meat fat includes only low amounts of meat protein from the input material, no special treatment is required in heating the meat fat to avoid denaturing any constituent that would be added to the final comminuted meat product.

Antimicrobial processing system 119 for the liquid raw lean meat constituent may comprise the heat pasteurization apparatuses and processes as described below in connection with FIGS. 10-12. These heat pasteurization apparatuses and processes may also be used for antimicrobial processing system 118 in connection with the fibrous raw lean meat constituent from outlet port 110 of separator 107. As will be described below in connection with FIGS. 10-12, the parameters, both operating parameters and structural parameters, employed in each system 118 and 119 may be tailored so the material being heat pasteurized. Thus the two different types of raw lean meat constituents (liquified and fibrous) may each be pasteurized under a different set of pasteurization parameters.

Alternatively, one or both of the lean meat streams from separators 107 and 112 may be treated with some other antimicrobial treatment, such as a pH enhancement as described in U.S. Pat. No. 6,379,728 for example. In yet other implementations, the fibrous raw lean meat constituent and liquid raw lean meat constituent may be combined and then processed through an antimicrobial treatment system (such as a heat pasteurization system) adapted to process the mixture, which would include essentially the entire spectrum of proteins included in the input material to the process. This variation would be in lieu of the arrangement shown in FIG. 1 in which each stream of raw lean meat material is processed through a separate antimicrobial processing system.

A number of alternatives are also possible particularly to the tempering systems 124 and 125 shown in system 100 in FIG. 1. Any suitable heat exchange system or combination of systems may be used for tempering system 124 to reduce the temperature of the raw lean meat to its blending temperature. As for the tempering system 125, although not apparent from FIG. 1, the system may include one or more components downstream from granule forming system 128 to either reduce the temperature of the meat fat granules to the meat fat blending temperature or ensure the previously cooled meat fat granules remain at the desired meat fat blending temperature, which may be no greater than 0° F. as noted above.

Another alternative to the arrangement shown in FIG. 1 relates to the tempered lean meat from lean tempering system 124. Some implementations may include a grinding system for forming the tempered lean meat into strands (such as 0.25 inch diameter strands for example) that are then released into the mixer system 140 or tempered further to the desired lean meat blending temperature. In such a pre-mixing grinding arrangement, a grinder force generating element that is preferably driven independently of the grinder blade(s) provides the force to press the raw lean meat from tempering system 124 through the grinder plate openings. This arrangement allows the period at which the grinder blade(s) pass over a given plate opening and the force at which material is pressed against the grinder plate to be varied independently. This facilitates better control over the size of the raw lean meat pieces that are formed in the grinder. Alternative systems may use a traditional meat grinding device for this additional grinding system for the raw lean meat.

Granule forming system 128 in FIG. 1 may comprise any device or system of devices for receiving meat fat separated from the input material and forming fat granules in the desired size range or size ranges. In some implementations, granule forming system 128 comprises a grinder system similar to that described in the previous paragraph for the raw lean meat grinding system. Thus granule forming system 128 may include a grinder plate with suitable grinder plate openings and one or more blades that are driven over the grinder plate openings. A suitable driving mechanism such as an auger driven separately from the grinder blade(s) or a suitable pump is included for applying the driving force to press the solidified fat from fat tempering system 125 through the grinder plate openings. Alternatively, granule forming system 128 may comprise any suitable device or system operable for producing the fat granules at the desired size or within the desired size range or ranges for mixing with the raw lean meat in mixing system 140. This includes a traditional grinder for example were the auger and blades are coupled so as to be driven together. Alternative arrangements may combine the tempering and granule forming steps so that the liquified fat from separator 112 or other suitable separating device is both tempered to the meat fat blending temperature and formed into granules simultaneously.

Figure 2:
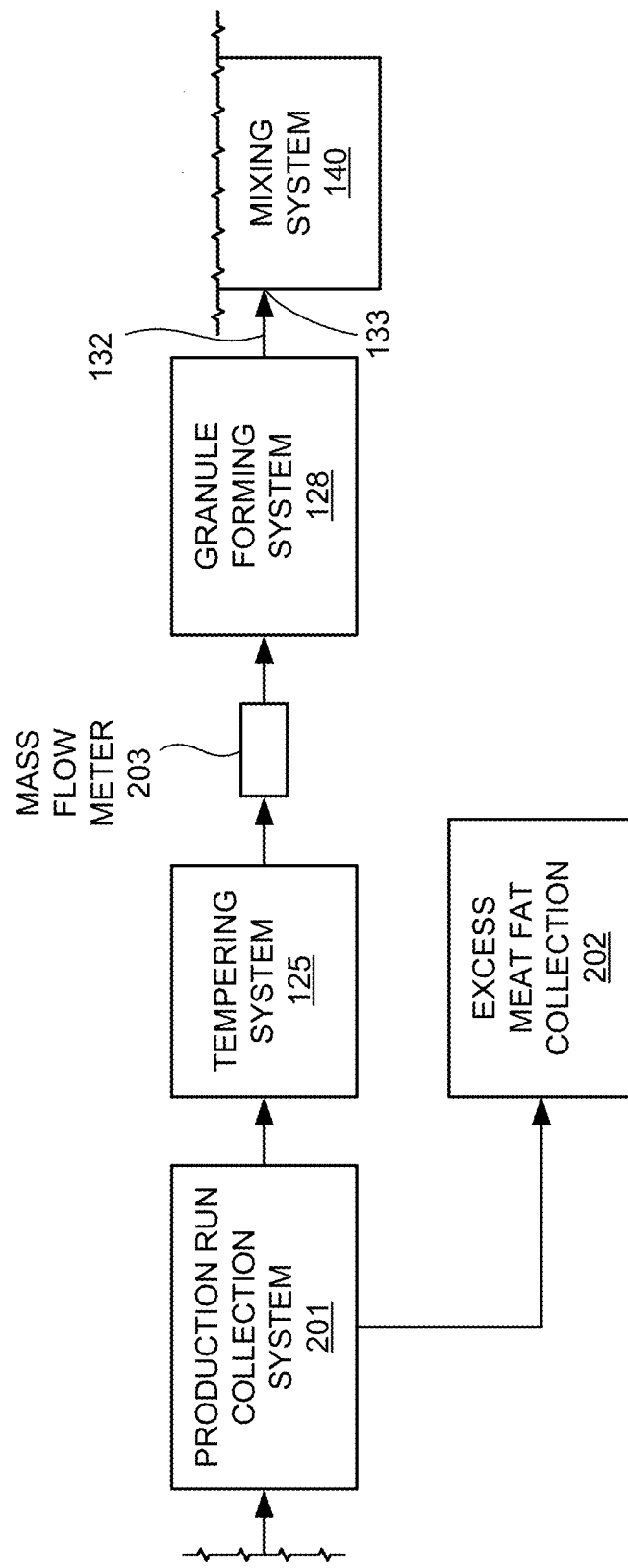
FIG. 2 is a schematic drawing showing further details regarding meat fat collection in the example system shown in FIG. 1.

FIG. 2 shows a portion of system 100 but with further detail regarding the handling of the meat fat separated at separator 112. This arrangement includes a production run collection system 201 for meat fat and an excess meat fat collection system 202 which together make up the excess fat diversion system 121 (FIG. 1) in this example embodiment. FIG. 2 also shows the fat tempering system 125, granule forming system 128, and mixing system 140 as described above in connection with FIG. 1. Production run collection system 201 includes a vessel connected to receive the meat fat separated at separator 112 over the time period of a given production run for the production of comminuted meat product. This production run time period may be defined in the system as single production day or any other suitable time period and represents the period of time in which lean meat is processed through the system 100 in FIG. 1 for introduction into mixing system 140 to produce the desired target comminuted meat product. In the example of FIG. 2, production run collection system 201 may simply receive all of the meat fat separated at separator 112. A fraction of this received meat fat may be directed either continuously or intermittently to tempering system 125 for processing as described above in connection with FIG. 1. Excess meat fat represents the amount of separated meat fat that is not used to produce the comminuted meat product at mixing system 140. Upon completion of the given production run, the example system shown in FIG. 2 transfers this unused, excess meat fat remaining at system 201 to excess meat fat collection system 202. System 202 may include suitable storage vessels for storing the excess meat fat for multiple production runs. Ultimately, all or most of the excess meat fat collected at system 202 may be sold or otherwise transferred on as a byproduct of system 100 in FIG. 1.

FIG. 2 also shows a mass flow meter 203 located between tempering system 125 and granule forming system 128. Mass flow meter 203 may comprise a Coriolis effect meter or any other suitable mass flow meter and operates in this example system to measure the mass of meat fat directed ultimately to mixing system 140 to produce a given amount of target comminuted meat product. Once mass flow meter 203 has measured a mass of meat fat needed for producing a given amount of target comminuted meat product (adjusted as needed to account for meat fat in process at granule forming system 128), the system may discontinue processing through tempering system 125 and granule forming system 128 for the given production run. Alternatively to a batch-type production system, the measurement output of mass flow meter 203 may be used as a control signal together with the signal from mass flow meter 135 in FIG. 1 to control a continuous target comminuted meat product mixing operation at mixing system 140.

Figure 3:
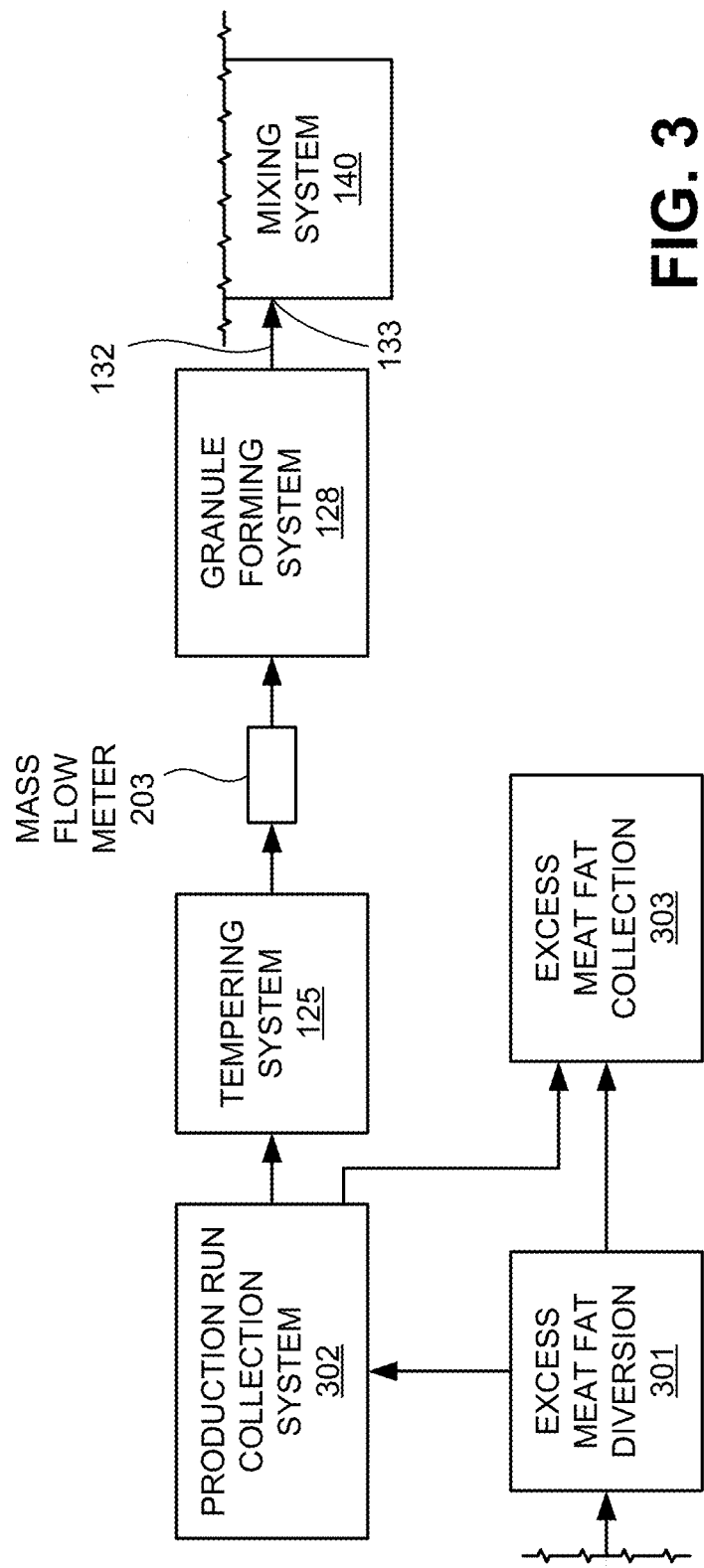
FIG. 3 is a schematic drawing showing an alternative arrangement for meat fat collection in the system shown in FIG. 1.

FIG. 3 shows an alternative arrangement for the excess fat diversion system 121 shown in FIG. 1 together with tempering system 125, mass flow meter 203, granule forming system 128 and mixing system 140 as shown in FIGS. 1 and 2. The example of FIG. 3 includes an excess meat fat diversion device 301 that receives the separated meat fat from separator 112 (via antimicrobial processing system 120 in the example of FIG. 1). Excess meat fat diversion device 301 diverts a sufficient fraction of the received meat fat continuously over the course of a production run to production run collection system 302. Production run collection system 302 functions similarly to system 202 in FIG. 2 but receives only the diverted fraction of the total meat fat stream from separator 112 rather than the entire stream. This diverted fraction of the total meat fat stream is still controlled to be sufficient to provide enough meat fat for the amount of target comminute meat product to be produced for the production run. However, excess meat fat, that is, meat fat in the stream from separator 112 in excess of that needed to produce the target comminuted meat product for the production run, is directed to storage at excess meat fat collection system 303. Also, any meat fat at production run collection system 302 that is not ultimately used in the target comminuted meat product may be directed to excess meat fat collection system 303 at the end of the production run.

Figure 4:
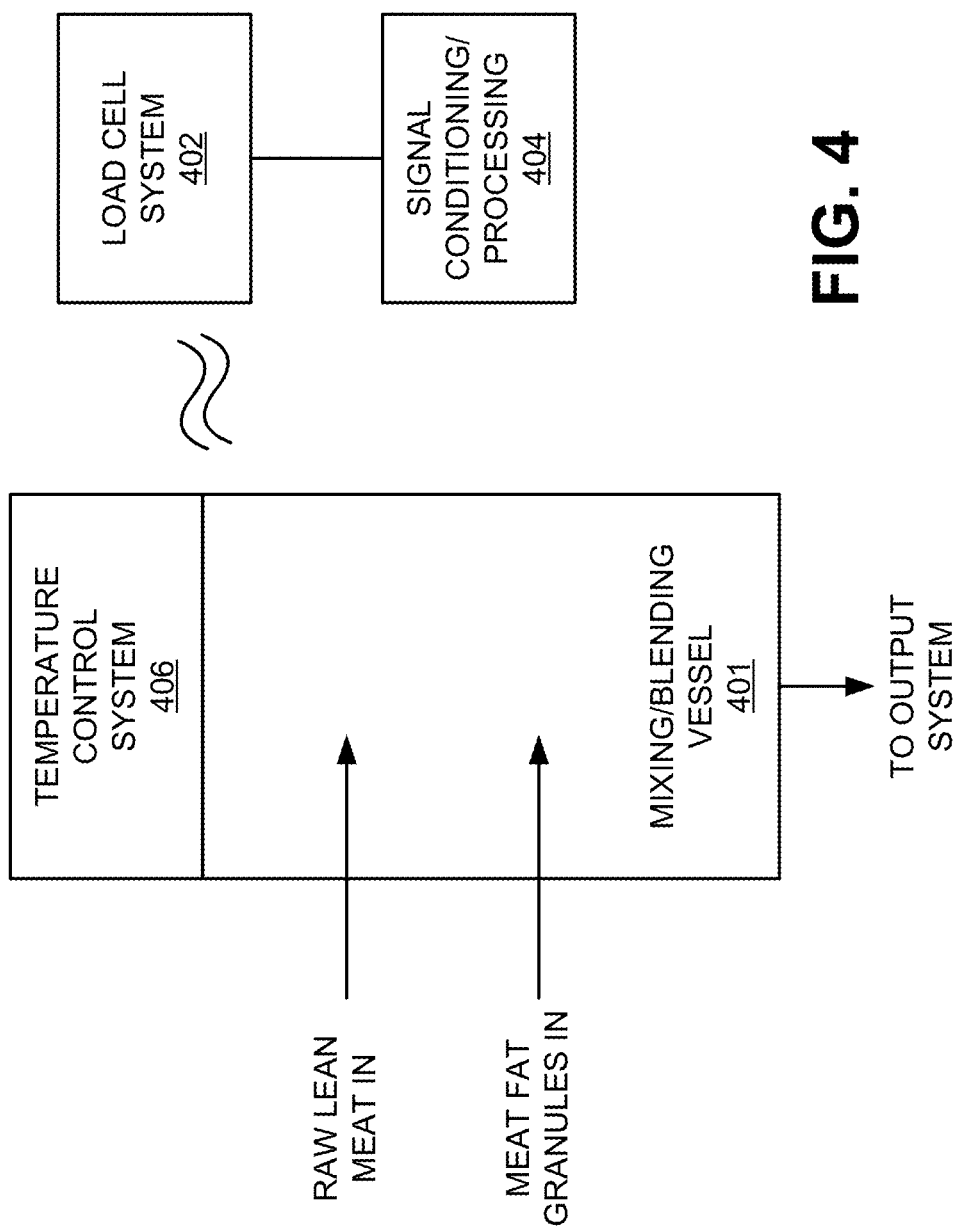
FIG. 4 is a schematic diagram showing an alternative arrangement for controlling the proportion of raw lean meat and meat fat granules mixed in the system of FIG. 1.
Figure 5:
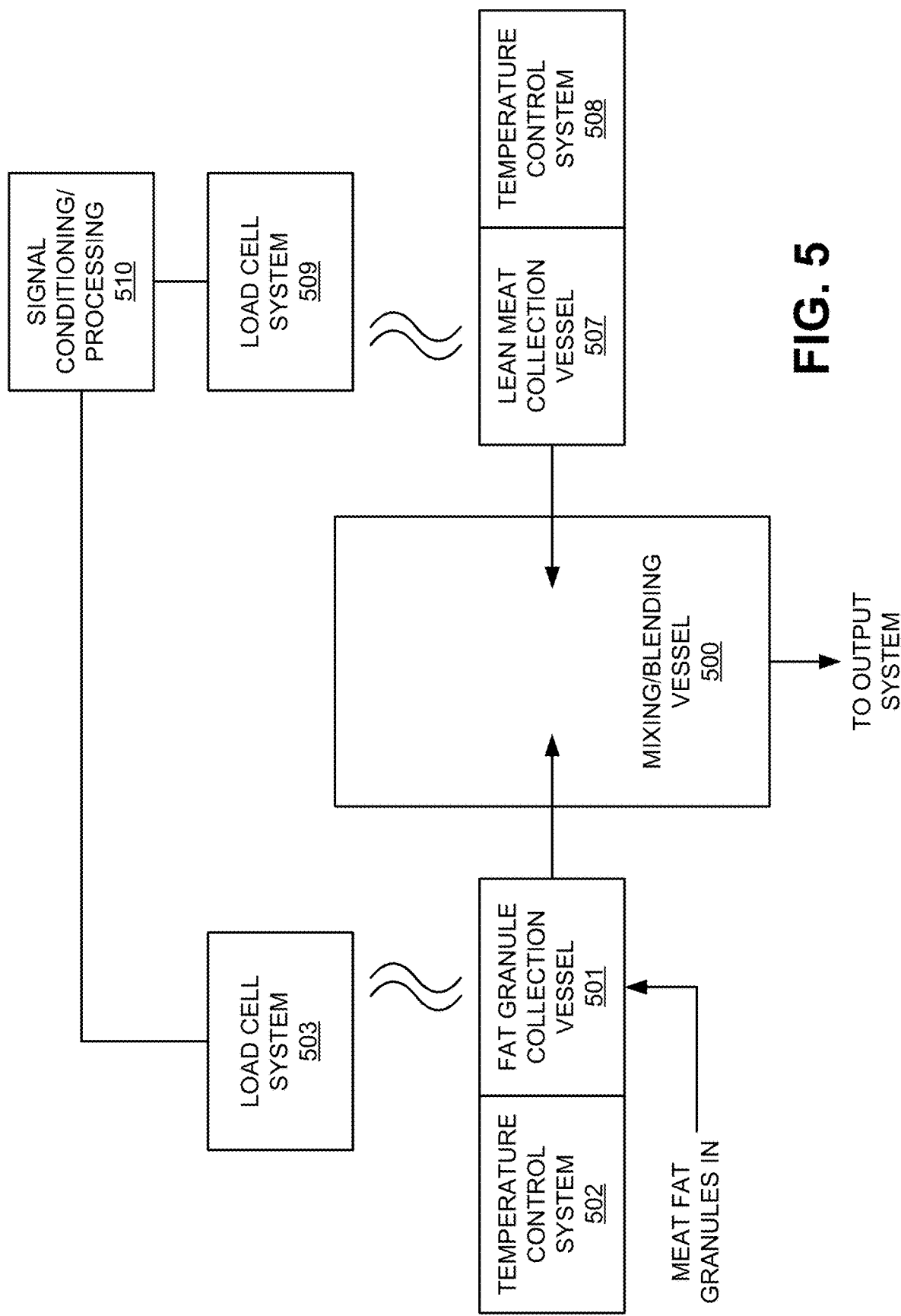
FIG. 5 is a schematic diagram showing a further alternative arrangement for controlling the proportion of raw lean meat and meat fat granules mixed in the system of FIG. 1.

FIGS. 4 and 5 show two different arrangements for controlling the production of the target comminuted meat product in batch processes without requiring mass flow meters such as meter 135 shown in FIG. 1 and meter 203 shown in FIGS. 2 and 3. Referring first to FIG. 4, mixing/blending vessel 401 may comprise a vessel for a paddle mixer or other mixing device of mixing system 140 shown in FIG. 1. Vessel 401 is configured to receive raw lean meat at the lean meat blending temperature (such as from lean tempering system 124 in FIG. 1) and to receive meat fat granules at the meat fat blending temperature (such as from granule forming system 128 in FIG. 1). These two materials may be directed to vessel 401 through suitable chutes or conduits in a staggered fashion, that is, not simultaneously. A temperature control or chilling system 406 is included in the system of FIG. 4 to help control the temperature of the contents of vessel 401 during the mixing operation and/or before and/or after. System 406 may comprise any suitable arrangement including an arrangement for supplying a chilled fluid to a jacket of vessel 401 or an arrangement for directing chilled air or some other material into vessel 401 for example. Vessel 401 is configured to direct its mixed output comprising the target comminuted meat product to a suitable output device such as a grinder or chub packaging device as described above in connection with FIG. 1. Vessel 401 is also associated with a load cell system 402 that includes one or more load cells positioned to receive the overall weight of the vessel and its contents and any attached equipment such as temperature control system 406, and provide weight signals accordingly to a signal conditioning/processing device 404.

The system shown in FIG. 4 operates by measuring the weight of the individual input streams of raw lean meat and meat fat granules required to produce a target comminuted meat product with the product target lean meat to meat fat proportion by weight. Because load cell system 402 measures the weight of vessel 401 as modified by both lean meat and meat fat input streams, material from the streams must be added asynchronously. For example, assuming a batch of 500 pounds of the target comminuted meat product is to have an 80/20 lean point, 80% lean meat and 20% meat fat by weight, raw lean meat at 96% lean and 4% meat fat will be added to the vessel to increase the weight detected by load cell system 402 by 417 pounds. Assuming the meat fat stream is made up of essentially 100% meat fat, meat fat granules will be added to the vessel to increase the weight detected by load cell system 402 by 83 pounds. The resulting mixture produced by mixing the added meat fat granules and the added 96/4 lean meat will have the total batch weight of 500 pounds of 80/20 comminuted meat (80% or 400 pounds of raw lean meat and 20% or 100 pounds of meat fat). To aid in the mixing operation performed in vessel 401, the raw lean meat and meat fat granules may be added to the vessel each in multiple steps rather than a single step each. For example, 100 pounds of the raw lean meat in the above example blend may be added and measured via load cell system 402 and device 404, and then 25 pounds of meat fat granules may be added and measured via load cell system 402 and device 404. These steps may be repeated until the total of 417 pounds of 96/4 raw lean meat and 83 pounds of meat fat are added for the batch.

An alternative weight measuring arrangement may use the load cell system 402 for only one of the two materials, either lean meat or meat fat. In these implementations, some other weight measuring system or technique may be used for the material not measured by load cell system 402. For example, a mass flow meter may be used to measure the weight of the meat fat added to vessel 401 while load cell system 402 is used to measure the weight of the lean meat added to vessel 401. It is also possible the employ a mass flow meter to measure the weight of the lean meat added to vessel 401 while load cell system 402 is used to measure the weight of the meat fat added to vessel 401. These alternatives allow lean meat and meat fat to be added simultaneously to vessel 401.

The alternative system shown in FIG. 5 includes a mixing/blending vessel 500 similar to that shown in FIG. 4 but relies on load cell systems associated with each of the streams of raw lean meat and meat fat rather than a load cell system for the mixing/blending vessel. The system of FIG. 5 includes a fat granule collection vessel 501 together with a temperature control system or chilling system 502. A load cell system 503 made up of one or more load cells receives the weight of fat granule collection vessel 501, temperature control system 502, and the contents of vessel 501. The system of FIG. 5 similarly includes a raw lean meat collection vessel 507, temperature control system or chilling system 508, and a load cell system 509 made up of one or more load cells receiving the weight of lean meat collection vessel 507, temperature control system 508, and the contents of vessel 507. Load cell systems 503 and 509 are each operatively connected to communicate their respective weight signals to a signal conditioning and processing device 510 that produces the corresponding weight data. In operation, meat fat granules (which may be heat pasteurized as described above) are directed to vessel 501 and raw lean meat (which also may be heat pasteurized as described above and further below in connection with FIGS. 10-12) is directed to vessel 507 to collect the weight of the respective material for the given batch to be produced. Once the required amount of material from each of the meat fat stream and raw lean meat stream is collected in the respective vessel 501 and 507 as indicated by the weight measured via load cell systems 503 and 509, the collected meat fat granules and raw lean meat may be transferred from the respective vessel 501 and 507 to vessel 500 for mixing/blending to produce the desired target comminuted meat product. Of course, multiple loads of each vessel 501 and 507 may be transferred to vessel 500 to produce a complete batch. Also, the transfer from vessels 501 and 507 may be done simultaneously or in a staggered fashion as desirable for loading vessel 500 for its mixing/blending operation. In any event, weighing the meat fat granules and raw lean meat separately in separate vessels allows the vessels to be filled simultaneously. Temperature control or chilling system 502 and 508 may be used to help maintain the meat fat granules and lean meat, respectively, at the desired bending temperature until the material is transferred into vessel 500. Although not shown in FIG. 5, vessel 500 may also have an associated temperature control or chilling system similar to system 406 in FIG. 4 to help control the temperature of the meat fat and lean meat while the materials are contained in vessel 500.

Figure 6:
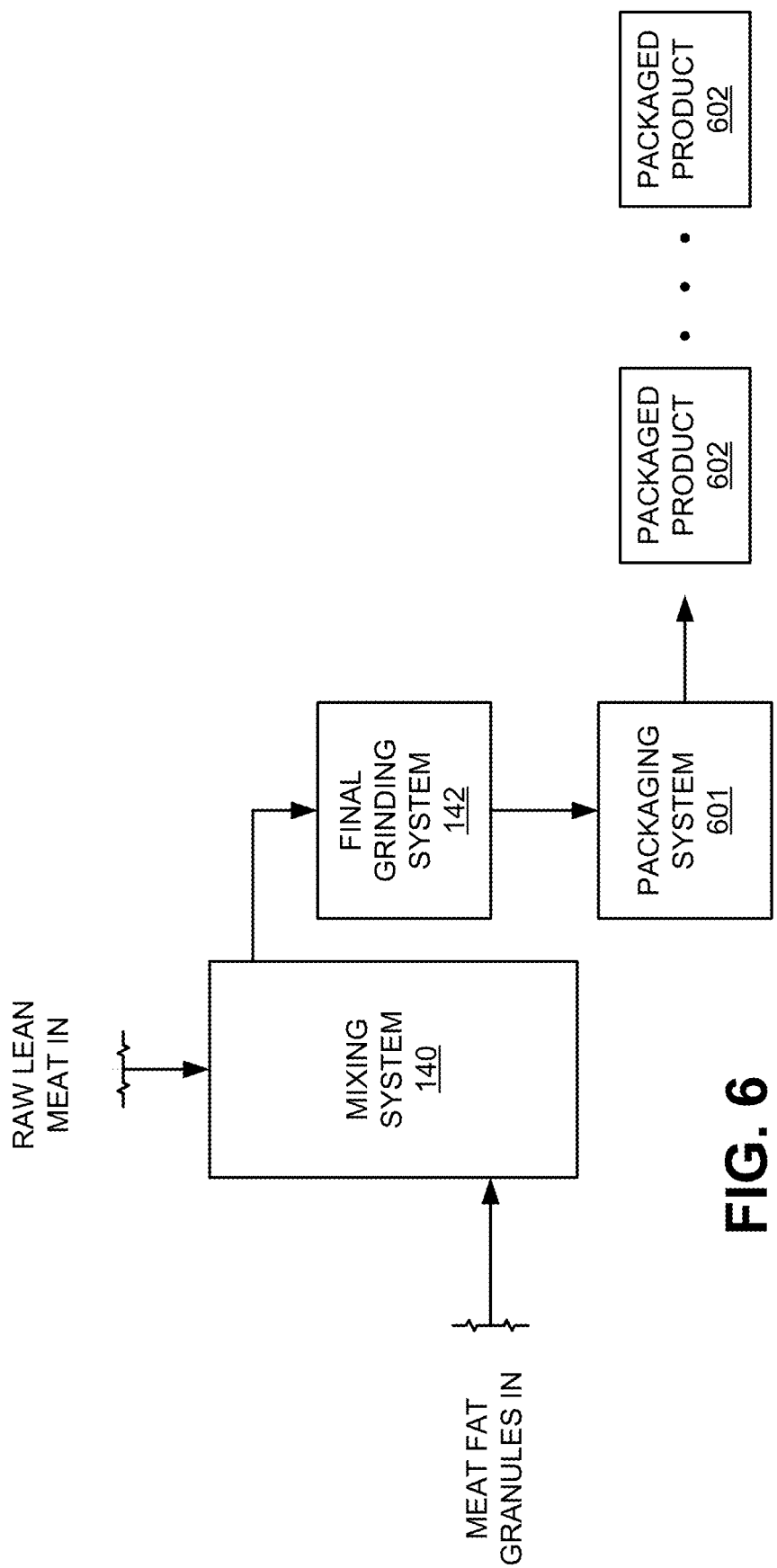
FIG. 6 is a schematic diagram showing a portion of the example system of FIG. 1 with additional features for processing the target comminuted meat product.

FIG. 6 shows further features that may be included in system 100 shown in FIG. 1. After mixing the meat fat granules and raw lean meat in mixing system 140 and grinding the comminuted meat product with final grinding system 142 (140 and 142 both also shown in FIG. 1), FIG. 6 shows a packaging system 601 operable to produce packaged products 602. These packaged products 602 comprise portions of the comminuted meat product contained within a suitable package for the material. Suitable packages may comprise tray-type packages and boxes or cartons for example as will be described below in connection with FIGS. 8 and 9. Suitable packaging for the comminuted meat product may also comprise a chub package, although in the case of chub packaging, the grind provided by final grinding system 142 may be omitted in some implementations.

Because the meat fat granules and the raw lean meat that are combined to produce the comminuted meat product may be heat pasteurized to essentially eliminate or deactivate microorganisms that lead to spoilage, the packaged products 602 may be shelf-stable for a period of time. This shelf-stability may extend for multiple days or longer even when not refrigerated. Shelf-stability here refers to the lack of changes in the comminuted meat product that occur as a consequence of spoilage bacteria propagation.

It should be noted that this benefit of a shelf-stable packaged comminuted meat product applies not only to comminuted meat products produced in system 100, but also to any raw comminuted meat product where the constituents of the comminuted meat product are each subjected to the heat pasteurization described further below. Thus in a ground meat blending operation such as that described in GB2240252, raw meat heat pasteurization as described below may be applied to each constituent prior to blending to produce a shelf-stable raw comminuted meat product. The heat pasteurization may alternatively be applied to the complete comminuted meat product (the product after grinding and any blending of raw meat constituents) to produce a shelf-stable raw comminuted meat product. In a further application of the heat pasteurization, the comminuted meat product may comprise, for example, a whole chicken leg that has been deboned. The heat pasteurization may be applied to the deboned whole chicken leg and the heat pasteurized product may then be packaged.

Figure 7:
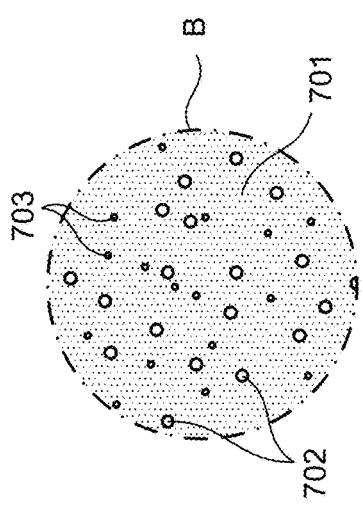
FIG. 7 is a schematic representation of a comminuted meat product that may be produced according to one or more of the methods described herein.

FIG. 7 shows within dot-dash boundary line B a schematic representation of a raw comminuted meat product that may be produced with system 100 shown in FIG. 1 and the above-described variations on that system. The raw comminuted meat product includes raw lean meat 701 with meat fat granules 702 and 703 disbursed and mixed randomly in the raw lean meat 701. These meat fat granules 702 and 703 are discrete meat fat granules enveloped within the mass of raw lean meat. It will be appreciated that although the meat fat granules 702 are all shown as having the same size as are the smaller meat fat granules 703, the meat fat granules in an actual product may vary significantly in size from one meat fat granule to the next. Also, both sizes of meat fat granules 702 and 703 are shown as circles only as a matter of convenience in the schematic representation of FIG. 7. In at least some embodiments the meat fat granules may be irregularly shaped.

Figure 9:
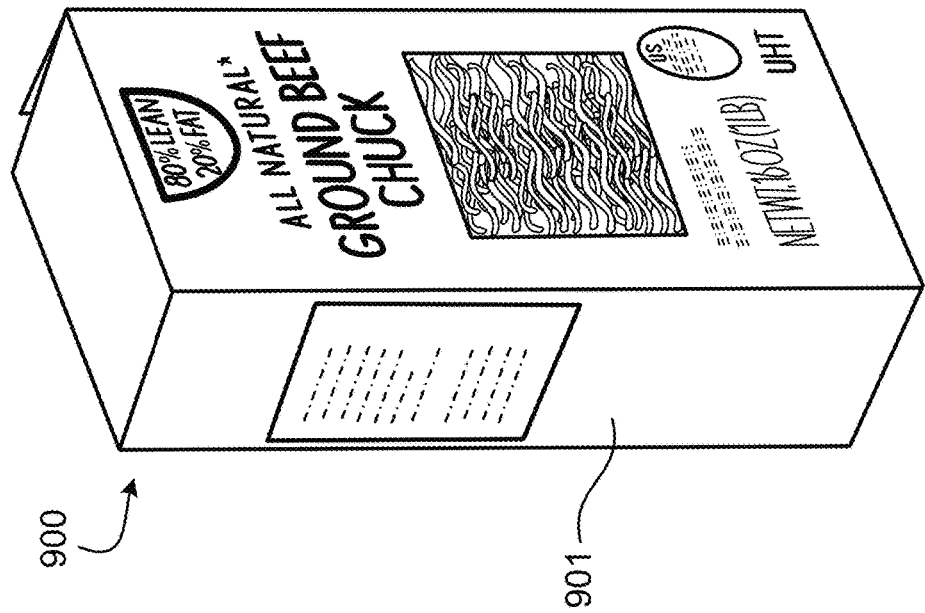
FIG. 9 is a representation of a box-type package containing a comminuted meat product produced according to one or more of the methods described herein.
Figure 8:
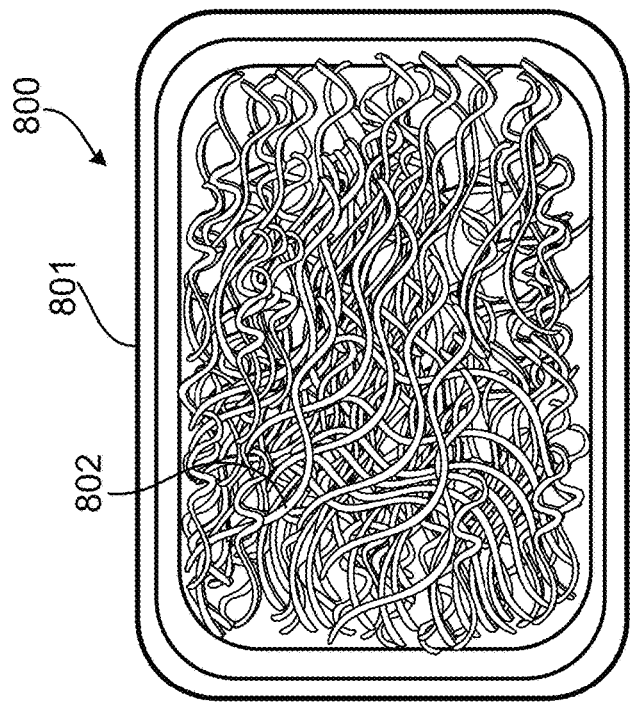
FIG. 8 is a representation of a tray-type package containing a comminuted meat product produced according to one or more of the methods described herein.

FIGS. 8 and 9 show examples of packages that may be used for packaged products 602 in FIG. 6. FIG. 8 shows a tray-type package 800 including a tray 801 of suitable material for containing a mass of raw comminuted meat product 802. The raw comminuted meat product 802 shown in FIG. 8 comprises a material that has been processed through a final grind (such as by grinder system 142 in FIGS. 1 and 6) to produce strands of the raw comminuted meat product. Although not shown in FIG. 8, the raw comminuted meat product 802 may be sealed within the tray-type package 800 with a suitable wrap material placed over the product 802 and then sealed at the back of tray 801. FIG. 9 shows a packaged product 900 in which the product is contained within a carton-type package 901. Carton-type package 901 may be formed from cardboard or plastic board and may be lined on the inside surface with a metal or plastic film suitable for contact with the raw comminuted meat product. Other types of packaging that may be used for raw comminuted meat product whether pasteurized or otherwise may include vacuum packages.

Figure 10:
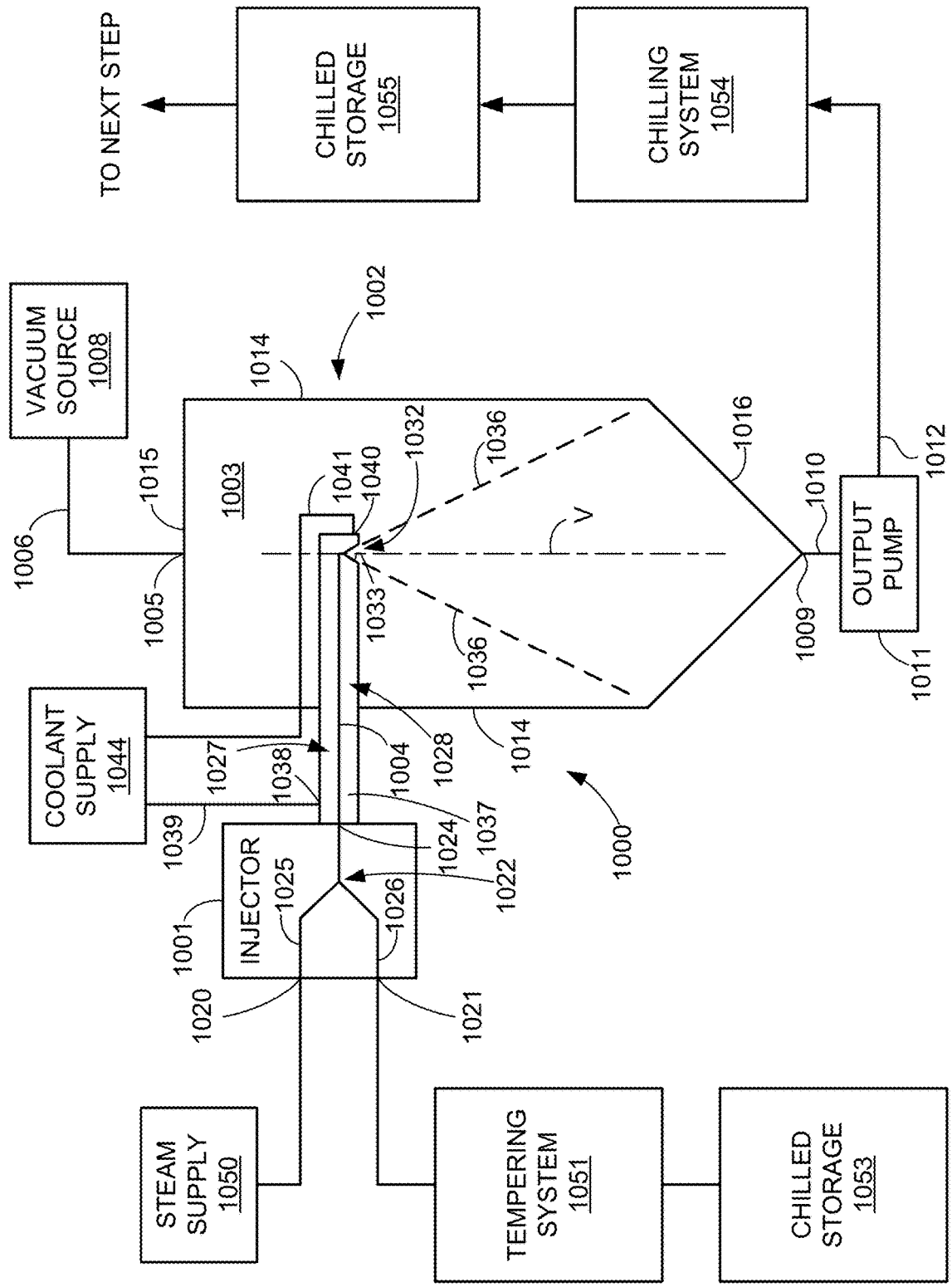
FIG. 10 is a schematic diagram showing a heat pasteurization system that may be used in the system shown in FIG. 1.

FIG. 10 shows a heat pasteurizing system 1000 suitable for use as antimicrobial processing system 118 and antimicrobial processing system 119 in system 100 shown in FIG. 1. System 1000 is also suitable for use in heat pasteurizing the blended raw lean meat from lean blending system 122 in FIG. 1 as an alternative to separately heat pasteurizing the fibrous lean meat from separator 107 in FIG. 1 and the liquid raw lean meat from separator 112 in FIG. 1. System 1000 may also be used for heat pasteurizing raw meat products outside of the context of system 100 shown in FIG. 1.

Referring to FIG. 10, a heat pasteurizing system 1000 includes a steam injector 1001 and a vacuum chamber 1002. Vacuum chamber 1002 includes a vacuum port 1005 connected by a suitable vacuum conduit 1006 to a vacuum source 1008, and also includes an outlet port 1009 connected by a suitable product outlet conduit 1010 to an output pump 1011. Steam injection system 1000 further includes a mixture flow path that extends from injector 1001 to vacuum chamber 1002. In this case the mixture flow path is defined by a hold conduit 1004 extending from steam injector 1001 to a location within the interior of vacuum chamber 1002, that is, a location within vacuum chamber volume 1003.

Vacuum chamber 1002 comprises a suitable vessel defining the vacuum chamber volume 1003. In this example, vacuum chamber 1002 includes lateral walls 1014, a top wall 1015, and cone-shaped bottom wall 1016 which together define vacuum chamber volume 1003. As indicated in FIG. 10, vacuum chamber 1002 may be elongated along a vertical axis V, and may be generally cylindrical in shape along that axis above the lower cone section. Output pump 1011 is connected to pump pasteurized material from vacuum chamber 1002 through output line 1012 to chilling system 1054 that may comprise a one-pass heat exchanger operable to chill the treated product down to a suitable temperature. System 1000 also includes chilled storage 1055 comprising a suitable chilled vessel adapted to hold pasteurized material until needed at the next processing step such as the blending performed at lean blending system 122 in FIG. 1 or packaging where the pasteurization is applied to a final comminuted meat product.

Steam injector 1001 in this example system is located outside of vacuum chamber volume 1003 and includes a steam inlet 1020 connected to receive steam from steam supply 1050 and a product inlet 1021 connected to receive the product to be heat pasteurized from tempering system 1051 which is in turn connected to receive product from chilled storage 1053. Chilled storage 1053 may be used in some cases to collect material to be heat pasteurized and ensure a suitable continuous flow rate through injector 1001. Tempering system 1051 is included in this example system to raise the temperature of the product to be pasteurized to a suitable input temperature for steam injector 1001.

Steam injector 1001 also includes a mixing structure shown generally at 1022 in FIG. 10 and a mixture outlet

1024. Mixture outlet 1024 comprises an outlet from steam injector 1001 through which the heated mixture, that is, heated product, any remaining steam, and any condensed water, may exit the steam injector. Generally, mixing structure 1022 includes a structure in which a steam path 1025 and product path 1026 merge within the injector to allow the steam and relatively cooler product to mix to thereby effect a rapid temperature increase in the product to a desired treatment temperature. The example steam injector 1100 described below in connection with FIGS. 11 and 12 shows an example of a structure for allowing steam and product to merge to produce rapid mixing.

The mixture flow path defined in example system 1000 by hold conduit 1004 begins at a mixture inlet opening operatively connected to mixture outlet 1024 of steam injector 1001. The mixture flow path defined by hold conduit 1004 includes a segment generally indicated at reference numeral 1027 located outside of vacuum chamber volume 1003 and a segment generally indicated at reference numeral 1028 located within the vacuum chamber volume. In this particular implementation, hold conduit 1004 extends to a nozzle 1032 located substantially in the center of vacuum chamber volume 1003 along the vacuum chamber vertical axis V. The mixture flow path shown in FIG. 10 terminates at the nozzle surfaces 1033 of nozzle 1032. These nozzle surfaces 1033 make up the surfaces of the flow path segment 1028 adjacent to a mixture release opening to the vacuum chamber volume defined at the lowermost end of surfaces 1033 in the orientation of FIG. 10. Nozzle 1032 is adapted to cause the material exiting the mixture flow path to form a downwardly-opening, cone-shaped stream indicated by dashed lines 1036 in FIG. 10. Alternative arrangements may locate the steam injector 1001 above the vacuum chamber 1002 so that the hold conduit 1004 extends downwardly to the mixture release point defined by nozzle 1032.

In example system 1000, the surfaces of the mixture flow path along its entire length are in substantial thermal communication with a cooling structure. The cooling structure in this example comprises a coolant fluid circulating chamber shown generally at reference numeral 1037 extending along the entire length of the mixture flow path including both segment 1027 and segment 1028. A coolant inlet port 1038 to coolant fluid circulating chamber 1037 is fed by coolant supply line 1039 and a coolant outlet port 1040 is connected to a coolant return line 1041. Coolant supply line 1039 and coolant return line 1041 are each operatively connected to a coolant supply 1044. It will be appreciated by those skilled in the art that coolant supply 1044 may include a suitable cooling or refrigerating system and a circulating pump, neither of which are shown in the drawing. The cooling or refrigerating system functions to cool a suitable coolant fluid to a desired temperature, while the circulating pump functions to direct the coolant fluid to coolant fluid circulating chamber 1037 through coolant supply line 1039 and coolant inlet port 1038. Coolant return line 1041 allows the coolant fluid to return to coolant supply 1044 once the coolant fluid has flowed along the length of coolant fluid circulating chamber 1037. It should be noted here that coolant fluid circulating chamber 1037 is isolated from the mixture flow path so that there is no mass transfer from the coolant fluid circulating chamber 1037 to the mixture flow path or vice versa, that is, no mixing of coolant fluid and product being treated.

The configuration of heat pasteurizing system 1000 is suited particularly for use in the comminuted raw meat production system 100 shown in FIG. 1. However, numerous variations are possible even in applications within system 100, and particularly in applications outside of system 100. For example, in some applications of heat pasteurization of raw meat, the pasteurized product may be frozen as a next step after removal from vacuum chamber 1002. In those cases, chilling system 1054 may be replaced with a suitable freezing system and chilled storage may be replaced with a freezer for frozen storage.

Figure 11:
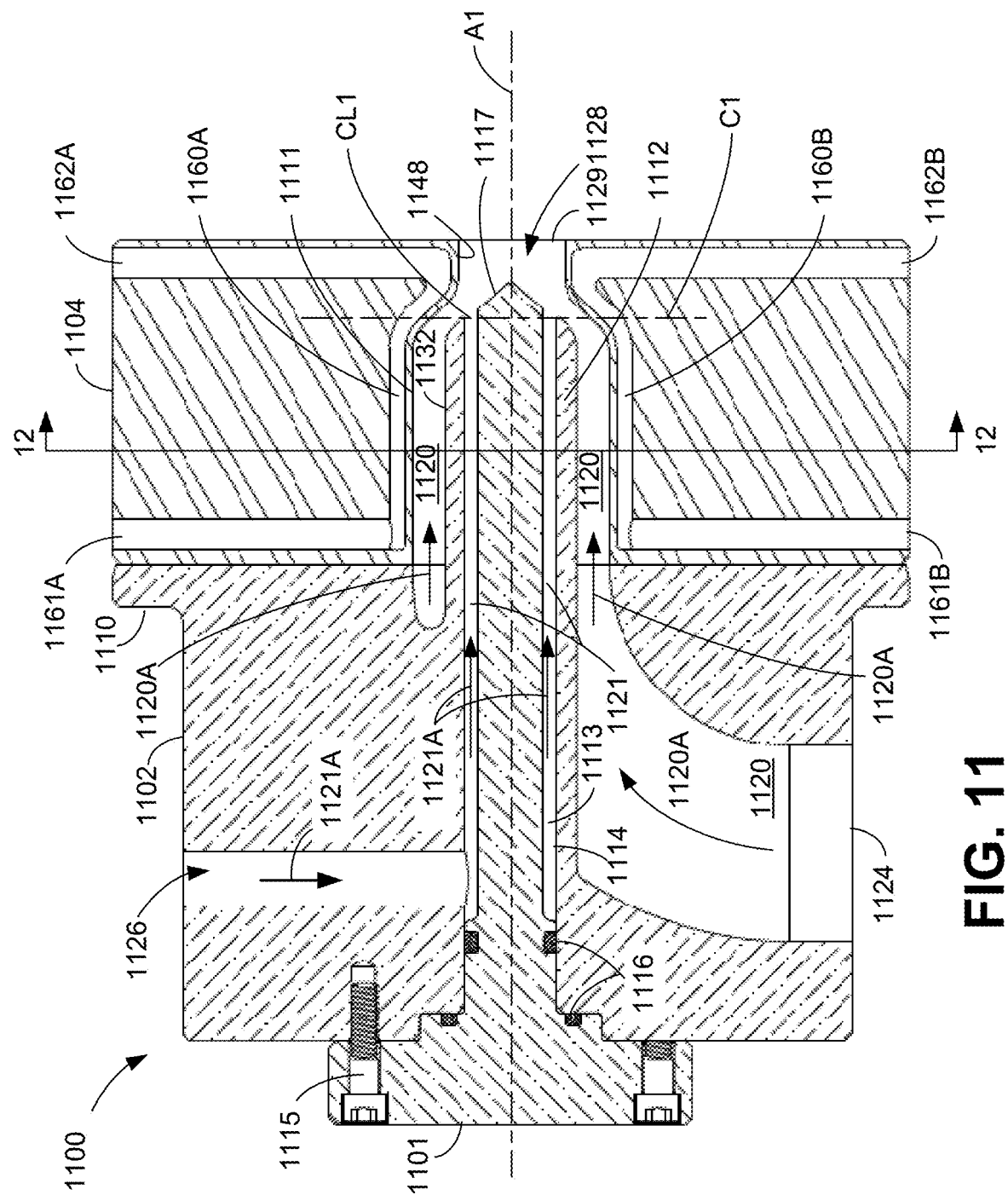
FIG. 11 is a longitudinal section view of a steam injector that may be used in the heat pasteurization system of FIG. 10.

FIG. 11 shows an example steam injector 1100 that may be used as injector 1001 in system 1000. Injector 1100 includes a center component 1101, a first end component 1102, and a second and component 1104. First end component 1102 includes a flange 1110 that may be used together with suitable bolts (not shown) to connect to second end component 1104. First end component 1102 also defines a center component receiving opening 1114 for receiving an elongated portion of center component 1101. Center component 1101 may be connected to first end component 1102 through suitable bolts 1115 and sealed using seals 1116. First end component 1102 includes a portion 1112 that protrudes so as to extend into an axial passage defined by surface 1111 in second end component 1104. Alternatively, this protruding portion 1112 may be a separately formed part connected between components 1102 and 1104. When connected in the operating position shown in FIG. 11, opening 1114 extends along the injector axis A1 and through the protruding portion 1112 to the contact location CL1 at the intersection of line C1 and the injector axis. Opening 1114 is adapted to receive the elongated portion of center component 1101 but leaves a gap 1113 between the outer surface of the center component and surface of opening 1114. This gap 1113 defines a portion of a flow path 1121 through injector 1100, with the remainder of the flow path defined by inlet passage 1126 in first end component 1102. The second flow path defined through injector 1100 comprises flow path 1120 which extends from an inlet opening 1124 in first end component 1102, through an elbow section in that component, and into an annular area defined between surface 1132 of protruding part 1112 and surfaces 1111 of second end component 1104. This annular flow path extends to an outlet passage 1128 comprising a mixture flow path leading to outlet opening 1129 and defines outlet passage surfaces 1148 in second end component 1104. The annular shape of the flow path defined between surfaces 1111 and 1132 (comprising a portion of flow the flow path 1120 in FIG. 11) is apparent especially from the transverse section view of FIG. 12. FIG. 12 additionally shows that the flow path defined by surfaces of opening 1114 and the exterior of center component 1101 (the flow path shown by arrows 1121A in FIG. 11) also defines an annular flow path.

In the example of injector 1100, the entire first end component 1102 and the entire center component 1101 may be formed from polyetheretherketone (PEEK) or other material having similar temperature moderating characteristics. Second end component 1104 in this example injector is formed from a suitable food processing grade material such as a suitable stainless steel. A cooling structure is included in second end component 1104. In the example of injector 1100, this cooling structure comprises two separate coolant circulating chambers 1160A and 1160B that each extend over a different part of the axial opening defined by surfaces 1111 and of the outlet passage 1128, and each include a respective coolant inlet 1161A, 1161B and coolant outlet 1162A and 1162B.

In some uses of injector 1100, steam is injected through inlet 1126 in first end component 1102 and directed along the flow path 1121 in the direction indicated by arrows 1121A in FIG. 11, which comprises an annular flow path between surfaces of opening 1114 and the elongated part of 1101 (gap 1113). Also in this preferred mode of operation, product to be treated is directed into the injector through inlet opening 1124 and along the flow path 1120 in the direction indicated by arrows 1120A including through the arcuate section and into the annular flow area defined between surfaces 1111 and 1132. The steam and product come together at the contact location CL1 and the mixture then flows to the right in the orientation of FIG. 11 through outlet passage 1128 and ultimately out of the injector through outlet opening 1129. As steam and product are so directed through injector 1100, a suitable coolant is circulated through coolant chambers 1160A and 1160B which together envelope the wall of material defining the entire surface 1111. This circulation of coolant cools surface 1111 to the desired temperature or desired operational effectiveness for reducing product deposits for the given product and thereby inhibits the deposition of constituents from the product on those surfaces. The PEEK from which surface 1132 is formed at the inside diameter of the annular product flow path 1120 inhibits the deposition of product constituents on that surface. Additionally, the PEEK material in which surfaces 1117 are formed downstream from contact location CL1 along injector axis A1 inhibits the deposition of product on those surfaces. It is noted that in this injector configuration, the coolant circulating chambers 1160A and 1160B each extend along a portion of the product flow path 1120, and then traverse the line C5 and thus also extend along the mixture flow path defined by passage 1128. Thus the same cooling arrangement provides the desired cooling and deposition inhibiting both upstream and downstream from contact location CL1 along injector axis A1.

Figure 12:
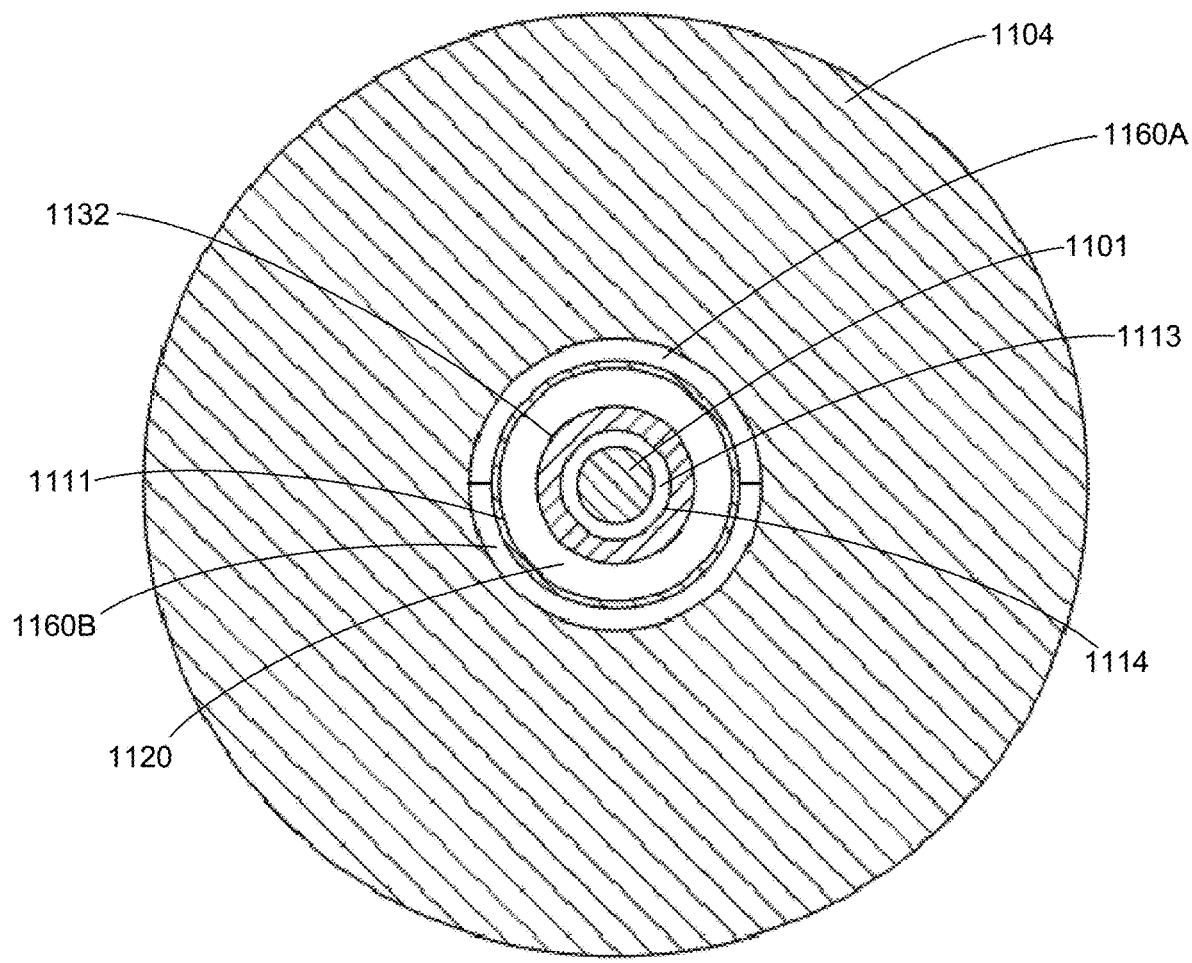
FIG. 12 is transverse section view taken along line 12-12 in FIG. 11.

Parameters of the example heat pasteurizing system 1000 shown in FIG. 10 and the steam injector 1100 shown in FIGS. 11 and 12 include operating parameters such as the temperature of the product as it enters steam injector 1100 and product flow rate through the injector. Other parameters of the pasteurization process include the various flow path dimensions within steam injector 1100, the shape of the flow paths in the injector, and the shape of the nozzle 1032 in vacuum chamber 1002, for example. A different set of these and other parameters of heat pasteurizing system 1000 may be used for each different input material to be heat pasteurized. For example, where a system similar to system 1000 is used for antimicrobial processing system 118 and antimicrobial processing system 1119 (both in FIG. 1), the system 1000 may include a different set of parameters for each material, that is, a first set of parameters for the liquid raw lean meat and a different, second set of parameters for the fibrous raw lean meat. Similarly, where system 1000 is used to heat pasteurize the blended liquid raw lean meat and fibrous raw lean meat from blending system 122 in FIG. 1, a different, third set of parameters may be needed or desirable. Yet a different set of parameters may be used where the material to be pasteurized comprises the final product such as the product from final grinding system 142 in FIG. 1. The direct steam injection applied in heat pasteurizing system 1000 may increase the temperature of the material being treated for example from an initial/tempered temperature of approximately 46° C. to approximately 82.2° C. substantially instantaneously. The material being treated may remain at that approximate 82.2° C. temperature approximately 0.3 seconds before vacuum chilled in vacuum chamber 1002. This example temperature and hold time has been found to provide effective pasteurization for lean meat.

As used herein, whether in the above description or the following claims, the terms "comprising," "including," "carrying," "having," "being," "containing," "involving," and the like are to be understood to be open-ended, that is, to mean including but not limited to.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of various aspects of the invention, but not to limit the scope of the invention. Various other embodiments and modifications to these representative embodiments may be made by those skilled in the art without departing from the scope of the claims set forth below. For example, in some instances, one or more features disclosed in connection with one embodiment can be used alone or in combination with one or more features of one or more other embodiments. More generally, the various features described herein may be used in any working combination.

The invention claimed is:

1. A method for producing a raw comminuted meat product, the method including:
    (a) receiving a stream of input material including pieces of meat;
    (b) separating a first material and a second material from the stream of input material so that the first material and second material are separate from each other, the first material including liquified meat fat and being substantially free of lean meat and the second material including raw lean meat;
    (c) forming meat fat granules from a portion of the first material; and
    (d) combining a quantity of the meat fat granules at a meat fat blending temperature with a quantity of the second material at a lean meat blending temperature to produce a target comminuted meat product having a target lean point.

2. The method of claim 1 wherein the first material contains no more than approximately 0.5% lean meat.

3. The method of claim 1 wherein the first material contains less than approximately 0.1% lean meat.

4. The method of claim 1 wherein the lean meat to meat fat proportion of the second material is no less than approximately 94%.

5. The method of claim 1 wherein the first material consists essentially of liquified meat fat and the second material consists essentially of raw lean meat.

6. The method of claim 1 further including:
    (a) over a production run time period, collecting the second material separated from the stream of input material to form the quantity of the second material;
    (b) over the production run time period, collecting the first material separated from the stream of input material;

(c) separating the first material collected over the production run time period, into a meat fat granule-forming stream of the first material and an excess meat fat stream of the first material; and (d) wherein the quantity of the meat fat granules at the meat fat blending temperature are formed from the meat fat granule-forming stream.

7. The method of claim 1 wherein the second material has an essentially homogeneous lean meat and meat fat content.

* * * * *